United States Patent [19]

Shiratori

[11] Patent Number: 5,679,474
[45] Date of Patent: Oct. 21, 1997

[54] OVERWRITABLE OPTOMAGNETIC RECORDING METHOD AND MEDIUM HAVING A LAYER WITH CURIE TEMPERATURE WHICH VARIES IN THE THICKNESS DIRECTION

[75] Inventor: Tsutomu Shiratori, Tokyo, Japan

[73] Assignee: Canon Kabushiki Kaisha, Tokyo, Japan

[21] Appl. No.: 479,831

[22] Filed: Jun. 7, 1995

Related U.S. Application Data

[63] Continuation of Ser. No. 758,199, Sep. 12, 1991, abandoned, which is a continuation of Ser. No. 457,881, Dec. 27, 1989, abandoned.

[30] Foreign Application Priority Data

| Dec. 27, 1988 | [JP] | Japan | 63-327642 |
| Apr. 13, 1989 | [JP] | Japan | 1-91873 |
| Dec. 20, 1989 | [JP] | Japan | 1-330035 |

[51] Int. Cl.⁶ .................. G11B 5/66; G11B 13/00; G11C 13/06
[52] U.S. Cl. .................. 428/694 ML; 428/694 SC; 428/694 MT; 428/694 MM; 428/694 EC; 428/694 GR; 428/900; 360/135; 365/122; 369/14; 369/15; 369/288; 430/945
[58] Field of Search .................. 428/694 ML, 694 SC, 428/694 MT, 694 MM, 694 EC, 694 GR, 900; 360/135; 365/122; 369/14, 15, 288; 430/945

[56] References Cited

U.S. PATENT DOCUMENTS

| 4,293,621 | 10/1981 | Togami | 428/678 |
| 4,645,722 | 2/1987 | Katayama | 428/694 ML |
| 4,670,356 | 6/1987 | Sato et al. | 428/693 |
| 4,882,231 | 11/1989 | Aratani | 428/611 |

FOREIGN PATENT DOCUMENTS

| 225141 | 6/1986 | European Pat. Off. . |
| 258978 | 3/1988 | European Pat. Off. . |
| 0282356 | 9/1988 | European Pat. Off. . |
| 243840 | 12/1985 | Japan . |
| 282944 | 11/1988 | Japan . |

OTHER PUBLICATIONS

Webster's New World Dictionary; 3d College Edition NY, 1988; p. 946.

*Primary Examiner*—Leszek Kiliman
*Attorney, Agent, or Firm*—Fitzpatrick, Cella, Harper & Scinto

[57] ABSTRACT

A magneto-optical recording medium with wide operating margins is disclosed.

The magneto-optical recording medium includes a vertical magnetic films of exchange-coupled liminated structure composed of a first magnetic layer with a high coercive force $H_H$ and a low Curie temperature $T_L$ and a second magnetic layer with a lower coercive force $H_L$ and a higher Curie temperature $T_H$ in comparison with those of the first magnetic layer. The first magnetic layer has a gradient of the Curie temperature along the direction of thickness of the layer so that the Curie temperature is higher at a position closer to the second magnetic layer.

The recording method utilizing the recording medium according to the present invention is also disclosed.

11 Claims, 8 Drawing Sheets

FIG. 7
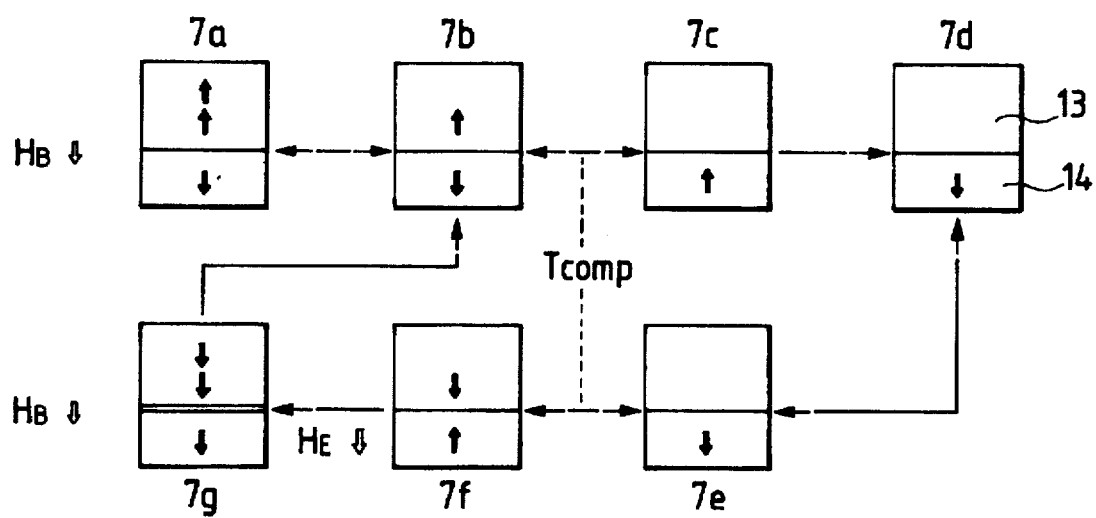
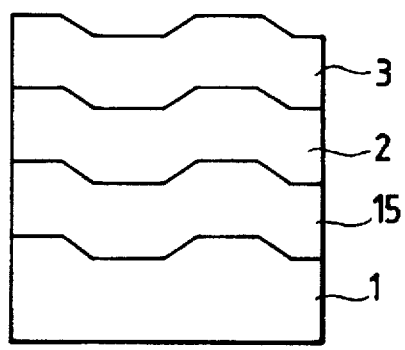
FIG. 9A
FIG. 9B
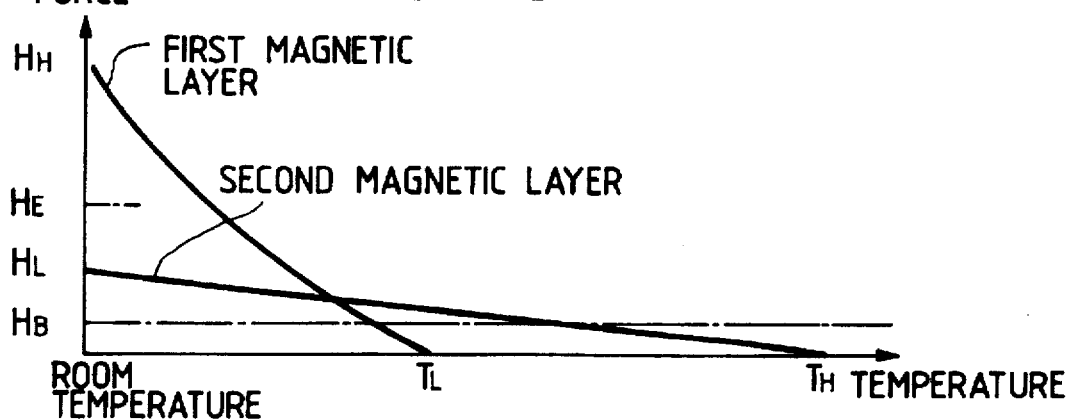

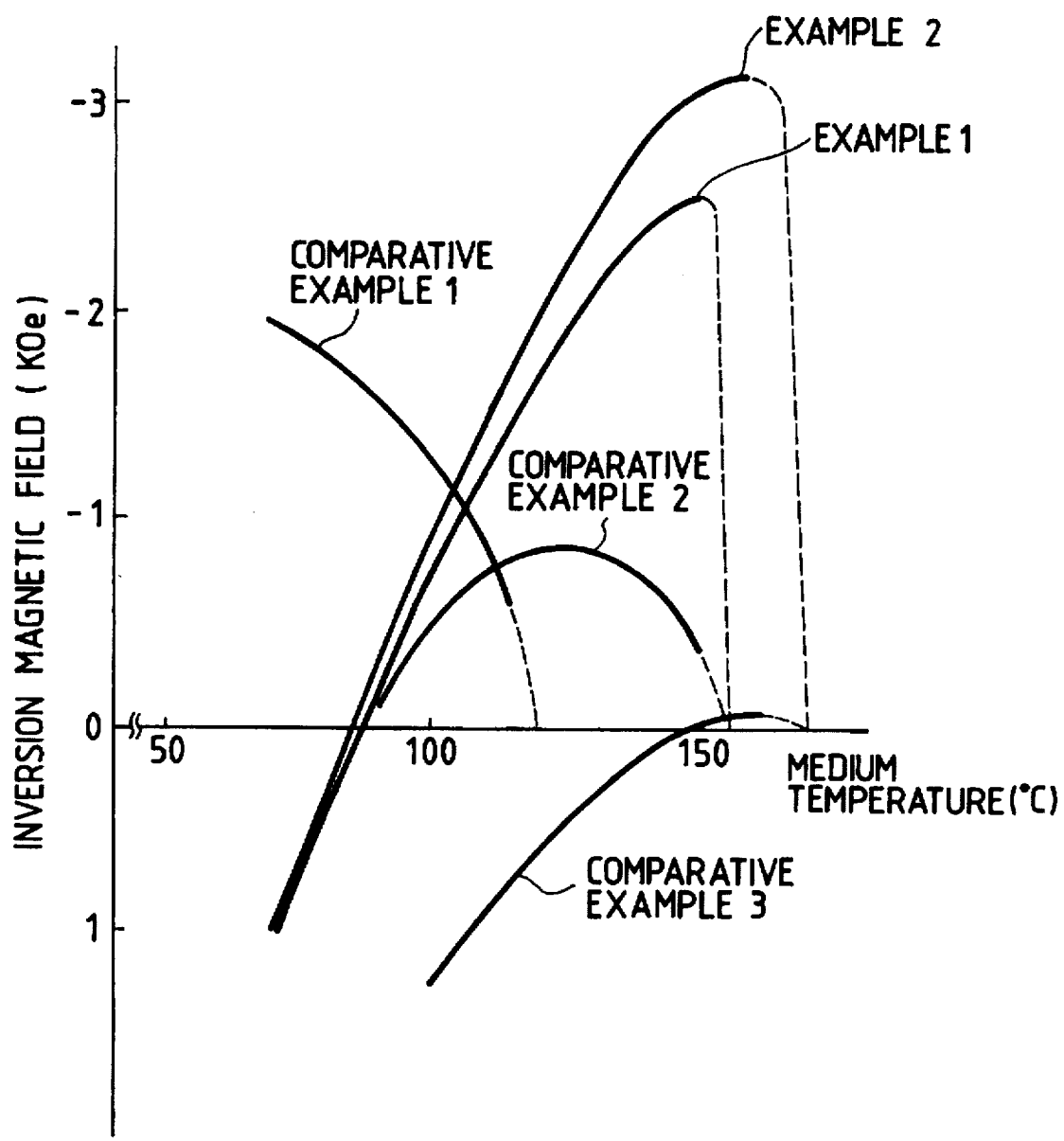

OVERWRITABLE OPTOMAGNETIC RECORDING METHOD AND MEDIUM HAVING A LAYER WITH CURIE TEMPERATURE WHICH VARIES IN THE THICKNESS DIRECTION

This application is a continuation of application Ser. No. 07/758,199 filed Sept. 12, 1991, which is a continuation of application Ser. No. 07/457,881 filed Dec. 27, 1989 both now abandoned.

BACKGROUND OF THE INVENTION

1. Field of the Invention

The present invention relates to a magneto-optical recording medium for information recording thermomagnetically and reading said information by utilizing magnetic Kerr effect, and a recording method utilizing such recording medium, and more particularly to such recording medium capable of overwriting and a recording method utilizing such recording medium.

2. Related Background Art

The magneto-optical memory is already known as an erasable optical memory. The magneto-optical memory has such advantages as high density recording, non-contact record/reproducing etc. in comparison with the conventional magnetic recording media utilizing a recording head, but has been associated with a drawback that the recorded area has to be erased (magnetized in a direction) prior to a new recording. For over-coming such drawback, there have been proposed a method of using a record/reproducing head and a separate erasing head, and a method of recording with a modulated magnetic field under irradiation with a continuous laser beam.

However, these methods are still defective in the bulkiness and expensiveness of the apparatus and in the difficulty of high-speed modulation.

In order to overcome the drawbacks in such prior art, the Japanese Patent Application No. 61-95510 (corresponding to the Japanese Laid-open Patent No. 62-175948) discloses a magneto-optical recording medium enabling overwriting as in the conventional magnetic recording media by adding simple magnetic field generating means to the conventional apparatus, and a recording method utilizing such recording medium. This magneto-optical recording medium and the recording method will be briefly explained in the following.

Said magneto-optical recording medium is basically composed of a pregrooved transparent substrate, and a first magnetic layer of a lower Curie temperature $T_L$ and a higher coercive force $H_H$ and a second magnetic layer of a higher Curie temperature $T_H$ and a lower coercive force $H_L$, in comparison with those of said first magnetic layer, said first and second magnetic layers being laminated in succession.

While the magneto-optical recording medium of the above-mentioned structure is rotated, there is applied, at a position different from the laser irradiating position, an initializing magnetic field of a magnitude enough for magnetizing the second magnetic layer in a direction but insufficient for inverting the magnetization of the first magnetic layer. At the same time a bias magnetic field is applied to the laser irradiating position, and the medium is simultaneously irradiated, according to the information signal, either with the laser beam of a power for heating said medium close to the lower Curie temperature thereby achieving the recording of a first kind in which the magnetization of the first magnetic layer is oriented in a stable direction with respect to the second magnetic layer while the magnetization of said second magnetic layer remains unchanged, or with the laser beam of a power for heating said medium close to the higher Curie temperature thereby achieving the recording of a second kind in which the direction of the magnetization of the second magnetic layer is inverted and the magnetization of the first magnetic layer is simultaneously oriented in a stable direction with respect to the second magnetic layer. After the recording, the recording bits in the medium is caused to pass the above-mentioned initializing magnetic field whereby the direction of the magnetization of the first magnetic layer remains unchanged while that of the second magnetic layer is oriented same as said initializing field. In this manner binary overwriting is achieved.

However this method, being still new, has various points to be resolved. More specifically, in the above-explained recording method utilizing the modulation of the laser power, the magnetization has to be inverted by the exchange force of exchange-coupled laminated films, against the biasing magnetic field. However already known media have been unable to provide wide record operating margins for example in the applied magnetic field and laser power, so that said inversion cannot be achieved easily and stably in the practical level. Also it has been difficult to prepare a practical medium providing wide margins with satisfactory stability of recording and high quality in the reproduced signals.

SUMMARY OF THE INVENTION

In consideration of the foregoing, a first object of the present invention is to provide a magneto-optical recording medium usable for overwriting with laser power modulation, capable of stable and easy inversion of the magnetization by the exchange force against the bias magnetic field, thereby easily expanding the operating margins for recording, and a recording method for such recording medium.

Another object of the present invention is to provide a recording medium having a high recording sensitivity and providing reproduced signals of high quality, and capable of easy inversion of the magnetization by the exchange force against the bias magnetic field, thereby providing wide operating margins, and a recording method therefor.

The above-mentioned objects can be attained by a magneto-optical recording medium having, on a substrate, vertical magnetic films of exchange-coupled laminate structure composed of a first magnetic layer of a high coercive force $H_H$ and a low Curie temperature $T_L$ and a second magnetic layer of a lower coercive force $H_L$ and a higher Curie temperature $T_H$, in comparison with those of said first magnetic layer:

wherein said first magnetic layer has a gradient of the Curie temperature along the direction of thickness of the layer so as to be higher in the Curie temperature at a position closer to said second magnetic layer but lower in that at a position far from said second magnetic layer.

Also the recording method utilizing such recording medium consists of steps of:

(a) applying a first magnetic field of a magnitude enough for orienting the magnetization of said second magnetic layer in a direction but insufficient for inverting the direction of the magnetization of said first magnetic layer; and (b) applying a bias magnetic field opposite to said first magnetic field and simultaneously irradiating the medium, selectively according to the information signal, with a light beam of a power for heating the medium close to the Curie temperature of the first magnetic layer to achieve the recording of a first kind in which the magnetization of the first magnetic layer is oriented in a stable direction with respect to the second magnetic layer while the direction of the magnetization of the second magnetic layer remains unchanged, or with a light beam of a power for heating the medium close to the Curie temperature of the second magnetic layer to achieve the recording of a second kind in which the direction of the magnetization of the second magnetic layer is inverted and the magnetization of the first magnetic layer is simultaneously oriented in a stable direction with respect to said second magnetic layer.

BRIEF DESCRIPTION OF THE DRAWINGS

FIG. 7 is a view illustrating the principle of recording method utilizing the magneto-optical recording medium of a second embodiment;

FIG. 8 is a chart showing the relation between the magnetic field to invert the magnetization for the first magnetic layer and the temperature in the first embodiment;

FIG. 9A is a schematic view of a third embodiment of the magneto-optical recording medium of the present invention;

FIG. 9B is a chart showing the relation between the coercive force and the Curie temperature in the respective layer of the third embodiment;

DETAILED DESCRIPTION OF THE PREFERRED EMBODIMENTS

Now the present invention will be clarified in detail by embodiments thereof shown in the attached drawings.

Figure 1:
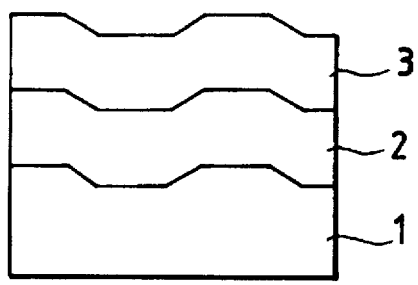
FIG. 1 is a schematic view of a magneto-optical recording medium of a first embodiment of the present invention.

FIG. 1 is a schematic cross-sectional view of a first embodiment of the magneto-optical recording medium of the present invention. Said recording medium shown in FIG. 1 is composed of a first magnetic layer 2 and a second magnetic layer 3 laminated in succession on a transparent substrate 1 provided in advance with guide grooves. The first magnetic layer 2 has a lower Curie temperature $T_L$ and a higher coercive force $H_H$, whereas the second magnetic layer 3 has a higher Curie temperature $T_H$ and a lower coercive force $H_L$. The terms "higher" and "lower" are defined by relative comparison of said two magnetic layers, and the coercive force is compared at room temperature.

Figure 2:
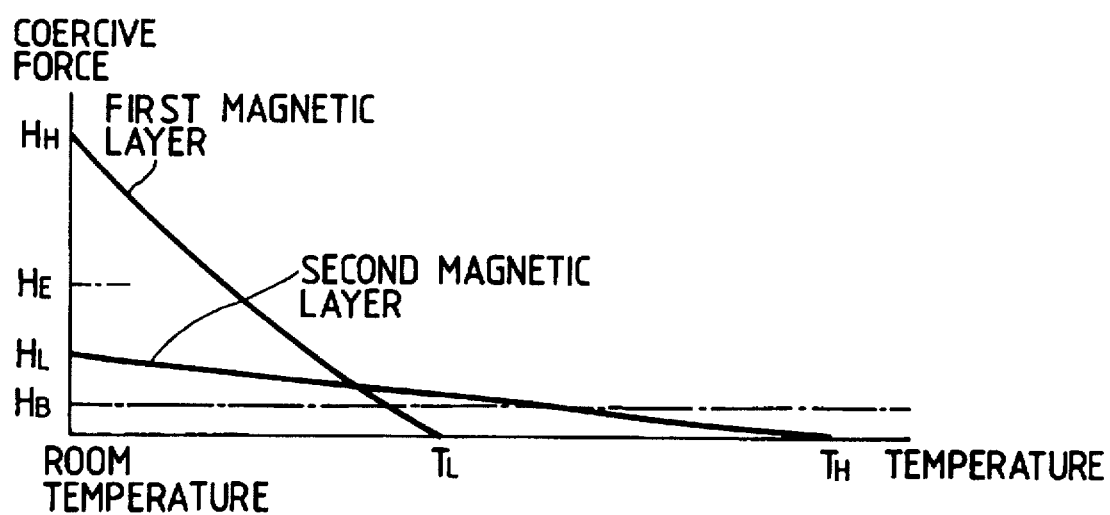
FIG. 2 is a chart showing the relation between the coercive force and the Curie temperature in the respective layer in said first embodiment.

FIG. 2 illustrates these relationships. In general, in the first magnetic layer 2, $T_L$ is selected in a range of 70° to 250° C., and $H_H$ in a range of 5 to 20 kOe. In the second magnetic layer, $T_H$ is preferable in a range of 150° to 400° C. and $H_L$ in a range of 0.5 to 5 kOe. The thickness of the first magnetic layer 2 is conveniently selected in a range of 300 to 1,000 Å, and that of the second magnetic layer 3 in a range of 300 to 2,000 Å.

Said magnetic layers can be composed of materials with vertical magnetic anisotropy and a relatively large magneto-optical effect, and preferably composed of amorphous magnetic alloys of rare earth elements and iron group elements, such as Tb—Fe, Tb—Dy—Fe, Dy—Fe, Tb—Fe—Co, Tb—Dy—Fe—Co, Dy—Fe—Co, Gd—Tb—Fe or Gd—Dy—Fe, Tb—Co, Dy—Co, Gd—Tb—Fe—Co, etc. for the first magnetic layer 2, and Tb—Fe, Tb—Dy—Fe, Dy—Fe, Tb—Fe—Co, Tb—Dy—Fe—Co, Dy—Fe—Co, Gd—Tb—Fe, Gd—Tb—Dy—Fe, Gd—Dy—Fe, Gd—Tb—Fe—Co, Gd—Tb—Dy—Fe—Co or Gd—Dy—Fe—Co, etc for the second magnetic layer 3.

In the recording method utilizing the magneto-optical recording medium of the present invention, the first magnetic layer 2 is mainly participated in the reproduction. More specifically, the magneto-optical effect exhibited by the first magnetic layer 2 is mainly utilized in the reproduction, while the second magnetic layer plays an important role in the recording.

Also the two-layered film of the recording medium of the present invention has to satisfy the following relation:

$$H_H > H_L > \frac{\delta_w}{2Msh}$$

wherein Ms is the saturation magnetization of the second magnetic layer 3, h is the film thickness, and $\delta_w$ is the magnetic wall energy between two magnetic layers; in order to stabilize the magnetization of the finally completed bit by recording.

Figure 3:
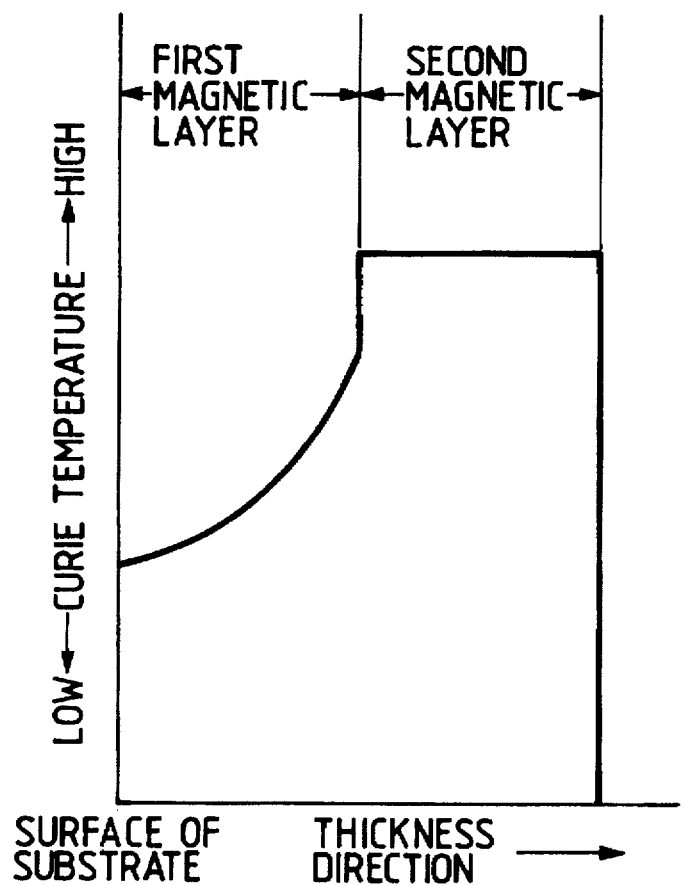
FIG. 3 is a chart showing change in Curie temperature of the respective layer in the direction of thickness of the layer in the first embodiment.

In the magneto-optical recording medium of the present invention, the first magnetic layer 2 has a gradient in Curie temperature, which is the higher the closer is to be second magnetic layer 3, as shown in FIG. 3. The change in the Curie temperature in the first magnetic layer 2 may be continuous or stepwise.

The gradient of the Curie temperature of the first magnetic layer 2 can be obtained, for example, by varying the composition of the above-mentioned material in continuous or stepwise manner.

Figure 4:
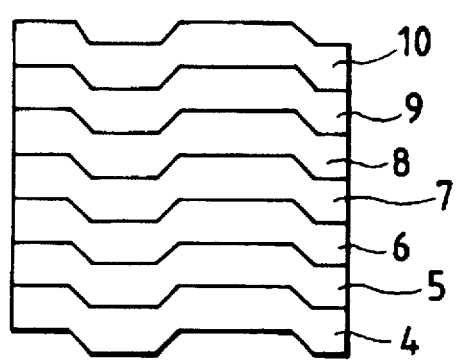
FIG. 4 is a schematic view of the first magnetic layer in said first embodiment.

Such continuous or stepwise variation of the composition of the material can be easily achieved by a multi-layered structure as shown in FIG. 4, which schematically shows the first magnetic layer 2 only of FIG. 1. In FIG. 4, numerals 4, 5, 6, 7, 8, 9 and 10 indicate magnetic layers of different compositions. In case of TbFe alloy, for example, the magnetic layers 4, 5, . . . . . 10 respectively have compositions $Tb_{x1}Fe_{1-x1}$, $Tb_{x2}Fe_{1-x2}$, . . . , $Tb_{x7}Fe_{1-x7}$. The continuous or stepwise variation of the Curie temperature can be realized by varying, continuously or stepwise, the compositions of said magnetic layers 4 to 10. A finer adjustment of the gradient of the Curie temperature can be attained by increasing the number of layers, while decreasing the thickness of each layer in such structure.

Also the gradient in the Curie temperature can be obtained by adding a non-magnetic element into the magnetic material, in an amount varying in the direction of thickness of the film.

The variation in the composition can be attained, for example in the sputtering method, by varying voltages applied to the targets.

The optimum gradient of the Curie temperature in the first magnetic layer 2 is dependent on various factors such as thickness of layers, recording conditions etc., but the difference in the Curie temperature on both ends of the layer in the thickness direction with a thickness of 300 to 1,000 Å is desirably equal to 10° C. or higher, preferably equal to 35° C. or higher. In the gradient of the Curie temperature in the first magnetic layer 2, the minimum value is preferably 100° C. or higher and the maximum value is about 250° C. or lower.

Furthermore, a suitable dielectric or reflective layer may be provided, between the transparent substrate and the magnetic layers or on said magnetic layers opposite to the substrate, in order to improve the durability, record/erasing sensitivity and magneto-optical effect.

Furthermore, a suitable magnetic or non-magnetic layer may be inserted between the first and second magnetic layers, in order to control the magnitude of exchange coupling therebetween.

Now reference is made to FIG. 5, and there will be explained a recording method utilizing the magneto-optical recording medium explained above.

Figure 5:
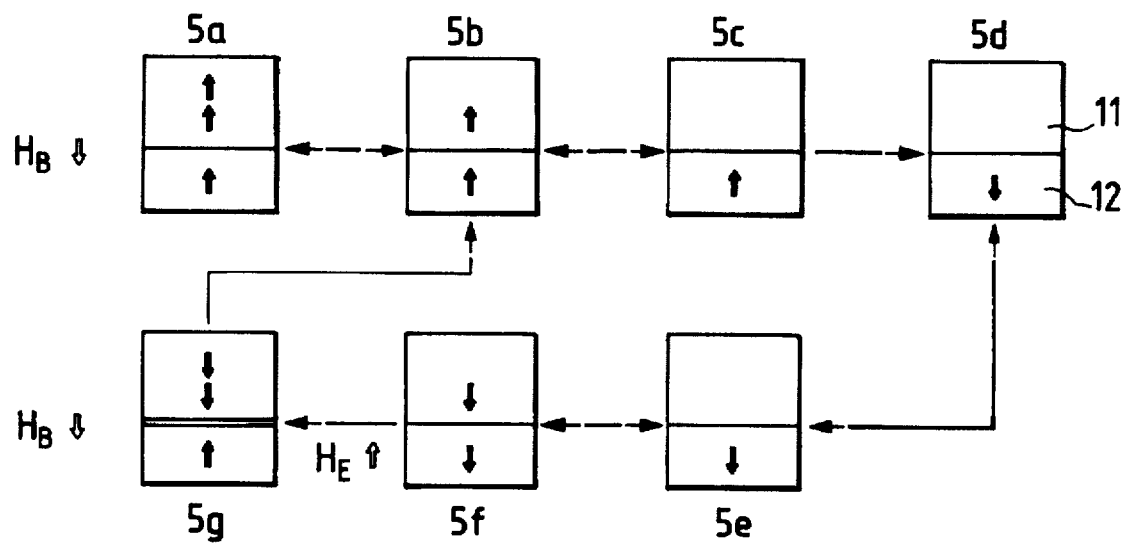
FIG. 5 is a view illustrating the principle of recording method utilizing the magneto-optical recording medium of said first embodiment.

In FIG. 5, the first and second magnetic layers are respectively indicated by 11 and 12, and the states of magnetization of said layers are shown by 5a to 5g. In the course of the recording, at a position different from that of the recording head, there is applied an upward external magnetic field $H_E$ of such a magnitude sufficient for orienting the magnetization of the second magnetic layer having the coercive force $H_L$ in a direction but insufficient for inverting the direction of the magnetization of the first magnetic layer having the coercive force $H_H$, and, at the position of the recording head, there is applied a downward bias magnetic field $H_B$ for assisting the recording on the second magnetic layer. The magnitude of $H_B$ is usually smaller than that of $H_E$.

Prior to the explanation of the recording process according to the steps thereof, there will be briefly explained the states 5a to 5g and the transitions between said states.

States 5a and 5g show two binary records at room temperature. The temperature rises progressively in the stages 5b, 5c and 5d by heating with the laser beam. States 5b and 5f, or 5c and 5e different states at an approximately same temperature. A mark ⇆ indicates a reversible magnetizing process with respect to the temperature, while a mark → or ← indicates an irreversible process. In the embodiment shown in FIG. 4, the first magnetic layer is for example composed of a thin amorphous rare earth-iron group alloy film with prevailing sub lattice magnetization by the iron group element, while the second magnetic layer is for example composed of a thin amorphous rare earth-iron group alloy film with prevailing sub lattice magnetization by the iron group element. In this case, because of the exchange coupling of both layers, the stable state is the state 5a in which the directions of magnetization of both layers are mutually parallel, and the unstable state is the state 5g in which said directions of magnetization are anti-parallel. A boundary magnetic wall exists in said state 5g. However, the coercive force energy of the second magnetic layer has to be so adjusted that the unstable state can be maintained even in zero magnetic field. At room temperature (states 5a and 5g), the magnetization of the second magnetic layer with smaller coercive force is always oriented upwards by the external magnetic field $H_E$.

In the following there will be explained the recording process, following the steps thereof.

When the temperature is raised from the state 5g, the coercive force of the first magnetic layer decreases rapidly as shown in FIG. 2. Therefore, since the magnetizations of both layers tend to become parallel by the exchange coupling thereof, the magnetization of the first magnetic layer is inverted upwards (state 5b). If the temperature is lowered from this state, the medium is cooled without change in magnetization, thus reaching the state 5a. If the medium is heated from the state 5a to the state 5b and is again cooled, the medium returns to the state 5a. Therefore, by the application of a laser power corresponding to the temperature of the state 5b, the states 5a and 5g are shifted to the state 5a.

On the other hand, if the temperature is further raised from the state 5b to the state 5c beyond the Curie temperature $T_L$ of the first magnetic layer, the first magnetic layer loses magnetization. A further raise in temperature reduces the coercive force of the second magnetic layer, whereby the magnetization thereof is inverted by the bias magnetic field $H_B$ (state 5d). If the temperature is lowered from this state, the first magnetic layer is magnetized downwards by the exchange coupling, and this state is retained down to room temperature, where the magnetization of the second magnetic layer is inverted by the external magnetic field $H_E$. However the first magnetic layer does not exhibit such inversion due to the higher coercive force and retains the recorded state. Therefore, by the application of a laser power corresponding to the temperature of the state 5d, the states 5a and 5g are shifted to the state 5g.

Consequently the application of different laser powers (corresponding to the temperature of the states 5b–5c or to the temperature of the state 5d can form different magnetization states (5a and 5g), thereby achieving overwriting.

In the transition from the state 5g to 5b, the magnetization of the first magnetic layer has to be inverted by the exchange force, against the bias magnetic field $H_B$. In order to facilitate said inversion of magnetization, it is necessary either to increase the magnetic wall energy at the boundary between the first and second magnetic layers, or to reduce the Zeeman energy of the layer of which magnetization is to be inverted, or to reduce the coercive energy thereof. The Zeeman energy is the product of magnetization, external magnetic field and thickness of layer at the contemplated temperature, and the coercive energy is the product of magnetization, coercive force and thickness of layer at the contemplated temperature. The increase in the magnetic wall energy at the boundary requires an increase in the coercive energy of the second magnetic layer at room temperature, thus leading to drawbacks of an excessively strong external magnetic field $H_E$ or a reduced sensitivity resulting from the thicker second magnetic layer. On the other hand, if the external magnetic field $H_B$ is reduced or the first magnetic layer is made thinner for reducing the Zeeman energy, there will result a deterioration in the recording property form the state 5c to 5d, or in the information reading property. Also in consideration of storage of the recorded information at room temperature, the coercive force of the first magnetic layer cannot be made excessively low.

On the other hand, the magnetization, coercive force and magnetic wall energy are all dependent on the temperature, and become lower as the temperature approaches to the Curie temperature. The above-explained transition relies in fact on the temperature dependence of these parameters, and is realized under a condition that, in the vicinity of the Curie temperature, the magnetic wall energy becomes larger than the sum of the Zeeman energy and the coercive energy. However the temperature dependence of said parameters is unstable and not easily controllable, and it is even more difficult to secure wide operating margins for achieving stable and easy transition from the state 5g to 5b.

Such drawbacks in the prior art have been solved in the present invention, by providing the first magnetic layer with lower Curie temperatures at positions close to the substrate and higher Curie temperature at positions close to the second magnetic layer. More specifically, at a temperature for causing the transition from the state 5g to 5b, the Curie temperature is reached in a part of the first magnetic layer, whereby the effective thickness of the layer having magnetization is reduced thereby facilitating said transition. The above-mentioned condition can be satisfied more easily by the decrease of the effective thickness of the layer, because the Zeeman energy and the coercive force energy are reduced while the magnetic wall energy is not affected. The part of the first magnetic layer having higher Curie temperature and still showing magnetization has to receive the exchange force from the second magnetic layer in contact therewith, so that the Curie temperature of the first magnetic layer has to be higher in a position closer to the second magnetic layer and lower at a position farther therefrom. If necessary a third magnetic or non-magnetic layer may be inserted between the first and second magnetic layers for controlling the magnitude of the exchange coupling, thereby facilitating the maintenance of the state 5g.

In the following there will be explained a second embodiment of the magneto-optical recording medium of the present invention.

Figure 6:
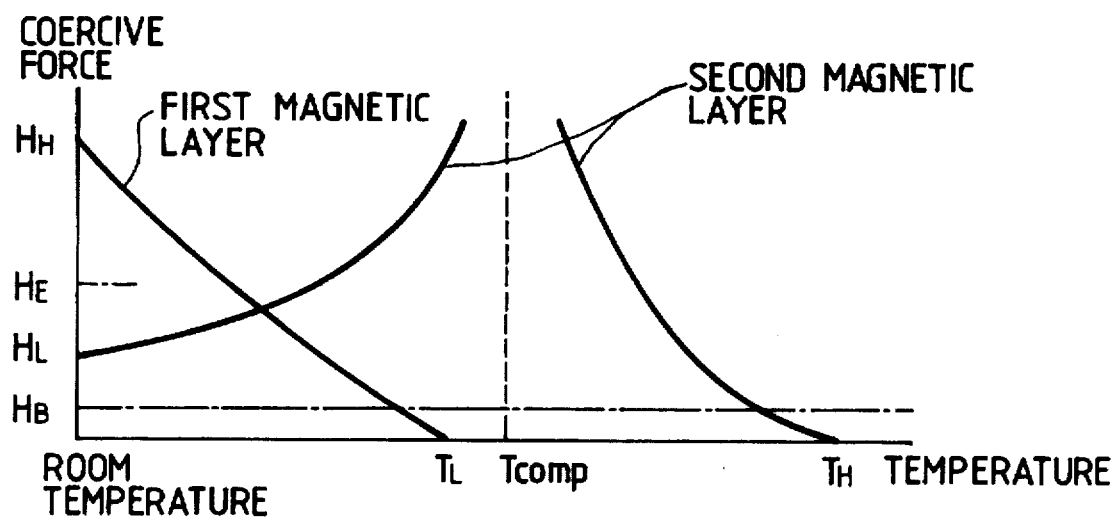
FIG. 6 is a chart showing the relation between the coercive force and the Curie temperature in the respective layer in a second embodiment.
Figure 10:
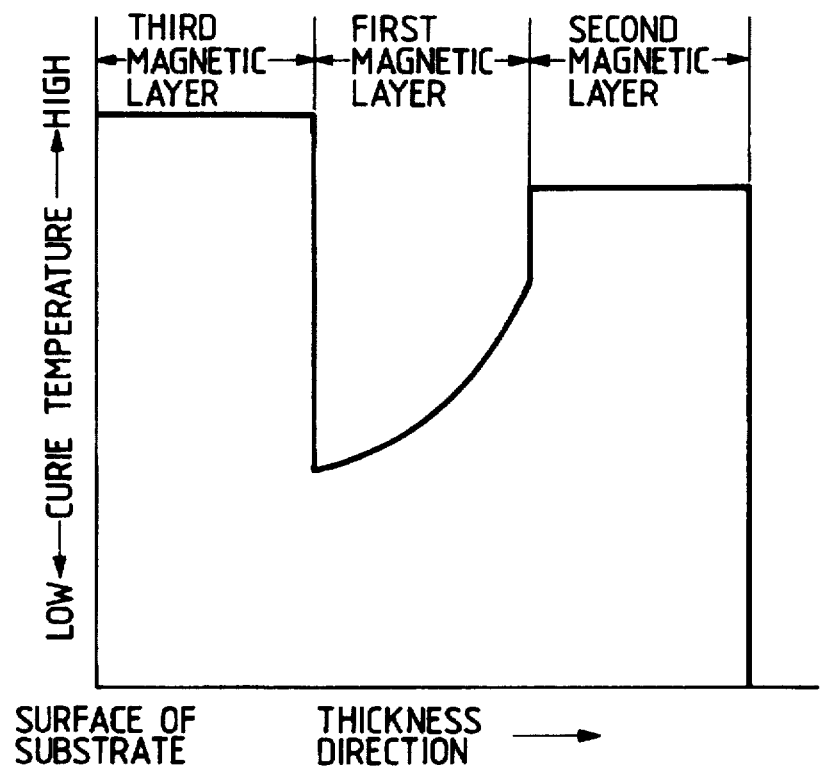
FIG. 10 is a chart showing change in Curie temperature of the respective layer in the direction of thickness of said layers in the third embodiment.

In said second embodiment, the first and second magnetic layers have relations of the coercive force and the Curie temperature as shown in FIG. 6. It is similar to the magneto-optical recording medium of the first embodiment except the process of change in the magnetization in the recording process. The coercive force $H_H$ and the Curie temperature $T_L$ of the first magnetic layer 2, and those $H_L$ and $T_H$ of the second magnetic layer 3 are shown in FIG. 6.

Now reference is made to FIG. 7 and the recording method utilizing the magneto-optical recording medium of the second embodiment will be explained. In FIG. 7, the first and second magnetic layers are respectively represented by 13 and 14, and different states of magnetization of said magnetic layers are shown by 7a–7g. In the course of recording, as explained in the foregoing, there is applied, at a position different from that of the recording head, a downward external magnetic field $H_E$ of a magnitude sufficient for orienting the magnetization of the second magnetic layer of coercive force $H_L$ in a direction but insufficient for inverting the direction of the magnetization of the first magnetic layer of coercive force $H_H$, and there is also applied, at the position of the recording head, a downward bias magnetic field $H_B$ for assisting the recording in the second magnetic layer.

States 7a and 7g show two binary records at room temperature. The temperature progressively rises in the states 7b, 7c and 7d by heating with the laser beam. The second magnetic layer has a compensation temperature $T_{comp}$ between the states 7b and 7c, or between 7e and 7f. In the embodiment shown in FIG. 7, the first magnetic layer is for example composed of a thin film of an amorphous rare earth-iron group alloy with prevailing sub lattice magnetization by the iron group element, while the second magnetic layer is for example composed of a thin film of an amorphous rare earth-iron gorup alloy with prevailing sub lattice magnetization by the rare earth element. In this case, because of the exchange coupling of both layers, the stable state is the state 7a in which the directions of magnetization of both layers are mutually antiparallel, and the unstable state is the state 7g in which said directions of magnetization are mutually parallel. A boundary magnetic wall exists in said unstable state 7g. However the coercive energy of the second magnetic layer has to be so adjusted that the unstable state can be maintained even in zero magnetic field. At room temperature (states 7a, 7g), the magnetization of the second magnetic layer of smaller coercive force is always oriented downwards by the external magnetic field $H_E$.

In the following there will be explained the recording process, following the steps thereof.

When the temperature is raised from the state 7g, the coercive force of the first magnetic layer decreases rapidly as shown in FIG. 6, and the coercive force of the second magnetic layer increases. Since the magnetizations of both layers tend to become antiparallel by the exchange coupling, the direction of the magnetization of the first magnetic layer is inverted upwards (state 7b). If the temperature is lowered from this state, the medium is cooled without change in magnetization, thus reaching the state 5a. If the medium is heated from the state 7a and to the state 7b and is again cooled, the medium returns to the state 7a. Therefore, by the application of a laser power corresponding to the temperature of the state 7b, the states 7a and 7g are shifted to the state 7a.

On the other hand, if the temperature is further raised from the state 5b to the state 5c beyond the compensation temperature $T_{comp}$ of the second magnetic layer, the magnetization thereof is reversibly inverted. A further raise in temperature reduces the coercive force of the second magnetic layer, whereby the magnetization thereof is inverted by the bias magnetic field $H_B$ (state 7d). If the temperature is lowered from this state, the medium is cooled without change in the state of magnetization, and, upon passing the compensation temperature $T_{comp}$, the magnetization of the second magnetic layer is reversibly inverted. About that time, the first magnetic layer is magnetized downwards by the exchange coupling effect. Then the medium is cooled to room temperature, where the second magnetic layer shows a low coercive force again, and the magnetization thereof is inverted by the external magnetic field $H_E$. However the first magnetic layer retains the recorded state, without being inverted by the external magnetic field $H_E$, due to the high coercive force thereof. Therefore, by the application of a laser power corresponding to the temperature of the state 7d, the states 7a and 7g are shifted to the state 7g.

Consequently the application of different laser powers (corresponding to the temperature of the states 7b–7c or to the temperature of the state 7d) can form different magnetization states (7a and 7g), thereby achieving overwriting.

In the transition from the state 7g to 7b, the magnetization of the first magnetic layer has to be inverted, as in the case of FIG. 5, by the exchange force, against the bias magnetic field $H_B$.

The contradicting drawbacks in the prior art can be solved by employing the magneto-optical recording medium of the present invention, in which the Curie temperature of the first magnetic layer becomes higher as the position becomes closer to the second magnetic layer.

In order that the magnetization of the first magnetic layer is oriented in a stable direction with respect to the magnetization of the second magnetic layer at the temperature of state 5b, 7b or 5f, 7f shown in FIG. 5 or 7, the portion exhibiting magnetization at said temperature in the first magnetic layer should preferably be thinner. Also in the course of cooling from said temperature to room temperature, the portion newly exhibiting magnetization for each given decrease of temperature should also preferably be thinner, in order that said magnetization is oriented in succession in the stable direction. However, as explained in the foregoing, the thickness of the first magnetic layer has a lower limit, and the Curie temperature in the the first magnetic layer has limitation in consideration of the recording sensitivity. For this reason the thickness of the portion newly exhibiting magnetization for each given decrease of temperature is also limited.

In order to augment the effect of the present invention under these limitations, the thickness of the portion newly exhibiting magnetization for each given decrease of the temperature increases as the temperature goes down. Stated differently, the gradient of the Curie temperature in the first magnetic layer should preferably become steeper as the position comes closer to the second magnetic layer.

On the other hand, if the portion exhibiting magnetization in the first magnetic layer at the temperature corresponding to the state 5b, 7b or 5f, 7f shown in FIG. 5 or 7 is thin enough that said magnetization of said portion is oriented in the stable direction with respect to the magnetization of the second magnetic layer, the Curie temperature of said portion need not be lower than that of the second magnetic layer. The Curie temperature of said portion is rather preferably higher in order to obtain a high magnetic wall energy between the first and second magnetic layers in the high temperature range.

In the foregoing, explanation, it is assumed, at the temperature corresponding to the state 5b, 7b or 5f, 7f shown in FIG. 5 or 7, that the portion with lower Curie temperature in the first magnetic layer has reached the Curie temperature and has completely lost the magnetization. However, even if the magnetization is not completely lost, the effect of the present invention can be likewise obtained if the contribution of said portion to the Zeeman energy based on the external magnetic field and to the coercive energy is lowered, since the effective thickness of the first magnetic layer can be considered equal to that of the portion with higher Curie temperature.

For the purpose of confirming the effect of the present invention, two magneto-optical recording media based on the first embodiment of the present invention and three media for comparative reference were prepared and subjected to the comparison of temperature characteristics of magnetizing process and of dynamic characteristics as will be explained in the following.

EXAMPLE 1

A disk-shaped polycarbonate substrate having pregrooves and preformatted signals was set and rotated in a sputtering chamber equipped with eight targets, at a distance of 20 cm from the targets.

At first a $Si_3N_4$ protective layer of a thickness of 600 Å was formed by sputtering in argon atmosphere with a $Si_3N_4$ target, with a sputtering rate of ca. 40 Å/min. and a sputtering pressure of 0.15 Pa.

Then a first magnetic layer of $Tb$-$(Fe_{1-y}$—$Co_y)$ with prevailing Fe—Co sub lattice magnetization was formed by sputtering in argon atmosphere by Tb, Fe and Co targets with a sputtering speed of ca. 100 Å/min. and a sputtering pressure of 0.15 Pa. The layer had a thickness of 360 Å, $H_H$=ca. 15 kOe and a saturation magnetization Ms=50 emu/cm$^3$. The Tb—Fe—Co composition was regulated by varying the electric powers supplied to the respective targets of Tb, Fe and Co. The amount y of cobalt was selected as 0, 0.02, 0.04 and 0.06 in respective thicknesses of 90 Å each, whereby the Curie temperature varies as 120°, 130°, 145° and 155° C. in succession, thereby realizing the structure of the feature of the present invention in which the Curie temperature of the first magnetic layer becomes higher at the position closer to the second magnetic layer.

Then, in argon atmosphere, an intermediate layer with a thickness of 100 Å of Gd—Tb—Fe—Co with prevailing Gd—Tb sub lattice magnetization and a saturation magnetization Ms of 420 emu/cm$^3$ was formed by sputtering in argon atmosphere by two targets of $Gd_{0.75}Tb_{0.25}$ and $Fe_{0.70}Co_{0.30}$, with a sputtering rate of ca. 100 Å/min and a sputtering pressure of 0.15 Pa. Said intermediate layer serves to regulate the exchange coupling between the first and second magnetic layers.

Then, in argon atmosphere, a second magnetic layer with a thickness of 700 Å of $(Gd_{0.50}Dy_{0.50})$-$(Fe_{0.60}Co_{0.40})$ with prevailing Gd—Dy sub lattice magnetization was formed by the use of two targets of $Gd_{0.50}Dy_{0.50}$ and $Fe_{0.60}Co_{0.40}$ with a sputtering rate of ca. 100 Å/min and a sputtering pressure of 0.15 Pa. The layer showed $T_H$=ca. 250° C., $T_{comp}$=ca. 170° C., $H_L$=ca. 2 kOe and Ms=100 emu/cm$^3$.

Finally a $Si_3N_4$ protective layer of a thickness of 600 Å was formed in argon atmosphere, by the $Si_3N_4$ target, with a sputtering rate of ca. 40 Å/min and a sputtering pressure of 0.15 Pa.

The magneto-optical recording medium was completed by adhering a polycarbonate substrate, with a hot-melt adhesive, onto the films thus prepared.

EXAMPLE 2

A magneto-optical recording medium was prepared in the same manner as in the example 1, except that the amount y of cobalt in the first magnetic layer was selected as 0 for the first 90 Å, 0.02 for next 90 Å, 0.04 for next 90 Å, 0.06 for next 45 Å and 0.08 for the last 45 A, whereby the Curie temperature varies highly as 120°, 130°, 145°, 155° and 170° C. with a steeper gradient, as the position approaches to the second magnetic layer.

COMPARATIVE REFERENCE EXAMPLE 1

A magneto-optical recording medium was prepared in the same manner as in the example 1, except that the first magnetic layer was composed of a uniform layer of Tb—Fe with y=0, in which the Curie temperature was 120° C.

COMPARATIVE REFERENCE EXAMPLE 2

A magneto-optical recording medium was prepared in the same manner as in the example 1, except that the first magnetic layer was composed of a uniform layer of Tb—Fe—Co with y=0.04, in which the Curie temperature was 145° C.

COMPARATIVE REFERENCE EXAMPLE 3

A magneto-optical recording medium was prepared in the same manner as in the example 1, except that the first magnetic layer was composed of a uniform layer of Tb—Fe—Co with y=0.08, in which the Curie temperature was 170° C.

The above-mentioned five media were subjected to the measurement of temperature characteristics of magnetization process, and FIG. 8 shows the temperature dependence of the magnetic field for inverting the magnetization of the first magnetic layer. In FIG. 8, a positive or negative inverting field respectively indicates that the magnetization of the first magnetic layer is inverted following or against the direction of the applied magnetic field. Consequently the margin of the recording bias magnetic field in the overwriting process corresponds to the negative peak value of the inversion field in FIG. 8.

As will be apparent from FIG. 8, the media of the examples 1 and 2 of the present invention have a larger margin of the recording bias field, in comparison with the media of the comparative reference examples 1, 2 and 3.

Also these magneto-optical disks were set on a record/reproducing apparatus and subjected to recording in the presence of a bias magnetic field of 400 Oe and an external magnetic field of 4 kOe (positioned outside the recording head), with a linear speed of ca. 8.5 m/sec. and with a laser beam of 830 nm condensed to a spot of ca. 1.5 µm and modulated with binary powers of 5 and 12 mW, a frequency of 1 mHz and a duty ratio of 50%.

After said recording, the same track was again subjected to recording with same powers and with a frequency of 1.5 MHz.

The obtained results are summarized in Tab. 1. The media of the example 1 and 2 of the present invention were superior, both in the C/N ratio and the erasing ratio, to those of the comparative reference example 1, 2 and 3.

The media of the comparative reference example 1 shows a large margin of the recording bias field, but generated noises due to poor stability of the record pit at room temperature. Also the media of the comparative reference example 3 could not achieve overwriting.

Tab. 2 shows the results of similar measurements, conducted with a bias magnetic field of 200 Oe.

In comparison with the preceding condition, this condition is favorable for orienting the magnetization of the first magnetic layer in a stable direction with respect to the magnetization of the second magnetic layer in the overwriting process, but is unfavorable for inverting the magnetization of the second magnetic layer to the direction of the bias magnetic field. Consequently, as shown in Tab. 2, the media of the example 1 and 2 of the present invention show satisfactory C/N ratio and erasing ratio, but those of the comparative reference examples 1 to 3 have unsatisfactory C/N ratio and erasing ratio.

There were further prepared two magneto-optical recording media based on the second embodiment of the present invention, and four media of comparative reference examples, and these media were subjected to similar comparison.

EXAMPLE 3

In argon atmosphere, a first magnetic layer of Tb-(Fe$_{1-y}$Co$_y$) with prevailing Fe—Co sub lattice magnetization, with a thickness of 500 Å, $H_H$=ca. 15 kOe and Ms=50 emu/cm$^3$, was formed with three targets of Tb, Fe and Co, with a sputtering rate of ca. 100 Å/min. and a sputtering pressure of 0.15 Pa. The Tb—Fe—Co composition was regulated by varying the electric powers supplied to the respective targets. The amount y of cobalt was progressively increased from 0 to 0.05 with a steeper gradient as the film grows, whereby the Curie temperature varied from 120° to 300° C. Thus obtained was the feature of the present invention, in which the Curie temperature of the first magnetic layer has a gradient, which is steeper as the position approaches to the second magnetic layer.

Then, for the purpose of regulating the magnitude of exchange coupling between the first and second magnetic layers, a SiN intermediate layer of a thickness of ca. 10 Å was prepared in argon atmosphere with a Si$_3$N$_4$ target, with a sputtering rate of ca. 3 Å/min. and a sputtering pressure of 0.15 Pa.

A magneto-optical recording media was prepared by employing the same structure as in the Example 1, in the remaining parts.

EXAMPLE 4

In argon atmosphere, a first magnetic layer of (Gd$_y$Tb$_{1-y}$)—Fe with prevailing Fe sub lattice magnetization, with a thickness of 500 Å, $H_H$=ca. 10 kOe and Ms=ca. 50 emu/cm$^3$, was formed with three targets of Gd, Tb and Fe, with a sputtering rate of ca. 100 Å/min. and a sputtering pressure of 0.15 Pa. The composition of Gd—Tb—Fe was regulated by varying the electric powers supplied to respective targets. The amount y of Gd was progressively increased from 0 to 0.50, more steeply as the film grows, whereby the Curie temperature varied from 120° C. to 170° C. There was thus obtained the feature structure of the present invention, in which the Curie temperature of the first magnetic layer increases with a gradient, more steeply as the position approaches to the second magnetic layer.

A magneto-optical recording medium was prepared by adopting the same structure as in the Example 3, in the remaining parts.

COMPARATIVE REFERENCE EXAMPLE 4

A magneto-optical recording medium was prepared in the same manner as in the Example 3, except that the first magnetic layer was composed of a uniform layer of Tb—Fe—Co with y=0.04, in which the Curie temperature was 145° C.

COMPARATIVE REFERENCE EXAMPLE 5

A magneto-optical recording medium was prepared in the same manner as in the Comparative Reference Example 4, except that the second magnetic layer was formed immediately after the formation of the first magnetic layer, without the SiN intermediate layer.

COMPARATIVE REFERENCE EXAMPLE 6

A magneto-optical recording medium was prepared in the same manner as in the Comparative Reference Example 5, except that the second magnetic layer had a thickness of 2000 Å.

COMPARATIVE REFERENCE EXAMPLE 7

A magneto-optical recording medium was prepared in the same manner as in the Comparative Reference Example 5, except that the second magnetic layer of Dy—Fe—Co with prevailing Dy sub lattice magnetization, with a thickness of 700 Å, $T_H$=ca. 250° C., $T_{comp}$=ca. 170° C., $H_H$=ca. 7 kOe and Ms=150 emu/cm$^3$, was prepared in argon atmosphere with two targets of Dy and Fe$_{0.50}$Co$_{0.50}$, with a sputtering rate of ca. 100 Å/min. and a sputtering pressure of 0.15 Pa.

The two media of the above-mentioned Examples and the four media of the Comparative Reference Examples were subjected to the measurement of temperature characteristics of magnetization process, and Tab. 3 summarizes the margin of the recording bias magnetic field $H_B$ and the external field $H_E$ required for orienting the second magnetic layer into a direction at room temperature.

The media of the Examples 3, 4 and the Comparative Reference Examples 6, 7 had a magnetization process capable of realizing the overwriting process. However the medium of the Comparative Reference Example 7 is not suitable for overwriting in practice, since the required external field $H_E$ is as large as 12 kOe.

Also in the Comparative Reference Example 4, with the decrease of the magnetic wall energy at the elevated temperature, the first magnetic layer becomes scarcely influenced by the exchange coupling, so that the magnetization of the first magnetic layer cannot be inverted against the recording bias magnetic field.

Also in the Comparative Reference Example 5, the magnetization of the second magnetic layer can be inverted to generate the boundary magnetic wall at $H_E=5$ kOe, but shows re-inversion when the field $H_E$ is eliminated and is therefore unable to maintain the unstable state. Thus the overwriting process cannot be realized.

Then the media of the Examples 3, 4 and the Comparative Reference Examples 6, 7 were set on a record/reproducing apparatus and subjected to the measurement of dynamic characteristics under the same conditions as explained above. Thus the media of the Examples 3, 4 respectively showed satisfactory C/N ratio of 50 and 52 dB and erasing ratio of 45 and 48 dB. On the other hand, the medium of the Comparative Reference Example 7 could not provide similar results unless initialized with a large permanent magnet generating a strong field of about 15 kOe. The medium of the Comparative Reference Example 6 showed poor recording sensitivity due to the very large film thickness, and could not show a C/N ratio even when recorded with a peak power of 13 mW.

EXAMPLE 5

A magneto-optical disk was prepared in the same manner as in the Example 1, except that the second magnetic layer of Gd—Dy—Fe—Co with prevailing Fe—Co sub lattice magnetization, with a thickness of 700 Å, $T_H$=ca. 250° C., $H_L$=3 kOe and Ms=100 emu/cm$^3$ was prepared with two targets of $Gd_{0.50}Dy_{0.50}$ and $Fe_{0.60}Co_{0.40}$ with a sputtering rate of ca 100 Å/min and a sputtering pressure of 0.15 Pa. The obtained disk was subjected to similar evaluations.

The results confirmed that the overwriting was possible with a bias magnetic field of 200–600 Oe.

COMPARATIVE REFERENCE EXAMPLE 8

A magneto-optical recording medium was prepared in the same manner as in the Example 4, except that the first magnetic layer was composed of a uniform layer of Tb—Fe—Co with y=0.04, in which the Curie temperature was 145° C. With said medium, the overwriting was possible with a bias magnetic field of 200 Oe but not possible with a bias magnetic field of 600 Oe.

TABLE 1

|  | C/N (dB) | Erasing ratio (dB) |
|---|---|---|
| Example 1 | 52 | 45 |
| Example 2 | 55 | 50 |
| Comparative Reference Example 1 | 40 | 20 |
| Comparative Reference Example 2 | 45 | 25 |
| Comparative Reference Example 3 | — | — |

TABLE 2

|  | C/N (dB) | Erasing ratio (dB) |
|---|---|---|
| Example 1 | 50 | 45 |
| Example 2 | 53 | 48 |
| Comparative Reference Example 1 | 38 | 20 |
| Comparative Reference Example 2 | 45 | 25 |
| Comparative Reference Example 3 | 35 | 20 |

TABLE 3

|  | $H_B$ margin (kOe) | $H_E$ (kOe) |
|---|---|---|
| Example 3 | 2.0 | 2.5 |
| Example 4 | 2.5 | 2.5 |
| Comparative Reference Example 4 | — | 2.5 |
| Comparative Reference Example 5 | — | (5.0) |
| Comparative Reference Example 6 | 2.0 | 3.0 |
| Comparative Reference Example 7 | 2.5 | 12.0 |

In the following there will be explained a third embodiment of the present invention.

For improving the quality of signal reproduced from the magneto-optical recording medium of the first embodiment, the structure of the medium of the third embodiment is featured by the presence, under the first magnetic layer, of a third magnetic layer of a Curie temperature higher than that of the first magnetic layer.

FIG. 9A shows the basic structure of the medium, wherein equivalent components to those in the foregoing embodiments are represented by same numbers. There are shown a pregrooved transparent substrate 1, a third magnetic layer 15, a first magnetic layer 2, and a second magnetic layer 3. The third magnetic layer 15 has a high Curie temperature. The first magnetic layer 2 has a low Curie temperature $T_L$ and a high coercive force $H_H$, and the second magnetic layer 3 has a high Curie temperature $T_H$ and a low coercive force $H_L$. The terms "high" and "low" are defined by the comparison of magnetic layers, and the Curie temperature $T_L$ of the first magnetic layer has some range. The coercive force is defined by comparison at room temperature. These relationships are summarized in FIG. 9B.

In general, the Curie temperature of the third magnetic layer is selected equal to 180° C. or higher. In the first magnetic layer, $T_L$ is selected in a range of 70°–250° C., while $H_H$ is selected in a range of 5–20 kOe or higher. In the second magnetic layer, $T_H$ is selected in a range of 150°–400° C., while $H_L$ is selected in a range of 0.1–5 kOe. The thickness is generally selected in a range of 200–1,000 Å for the third magnetic layer, 100–1,000 Å for the first magnetic layer, and 200–2,000 Å for the second magnetic layer.

Each magnetic layer is composed of a material showing vertical magnetic anisotropy and relatively large magneto-optical effect, preferably an amorphous alloy of rare earth elements and iron group elements. For example the third magnetic layer can be composed of Gd—Fe, Gd—Co, Gd—Fe—Co, Gd—Dy—Fe—Co, Dy—Fe—Co, Gd—Tb—Fe—Co, Gd—Nd—Fe—Co, Nd—Dy—Fe—Co, Pr—Dy—Fe—Co, Nd—Tb—Fe—Co, Tb—Fe—Co, etc., the first magnetic layer can be composed of Tb—Fe, Tb—Co, Tb—Dy—Fe, Dy—Fe, Dy—Co, Tb—Fe—Co, Tb—Dy—Fe—Co, Dy—Fe—Co, Gd—Tb—Fe—Co, Gd—Tb—Fe, Gd—Dy—Fe, etc., and the second magnetic layer can be composed of Tb—Fe, Tb—Dy—Fe, Dy—Fe, Tb—Fe—Co, Tb—Dy—Fe—Co, Dy—Fe—Co, Gd—Tb—Fe, Gd—Tb—Dy—Fe, Gd—Dy—Fe, Gd—Tb—Fe—Co, Gd—Tb—Dy—Fe—Co, Gd—Dy—Fe—Co, etc. Also it is desirable that the third magnetic layer is composed of a material of small vertical magnetic anisotropy while the first magnetic layer is composed of a material of large vertical magnetic anisotropy. The easy axes of magnetization of the magnetic layers are preferably all vertical to the layers, but at least one of said axes needs to be vertical.

As already explained in the foregoing first embodiment, the first magnetic layer 2 and the second magnetic layer 3 satisfy:

$$H_H > H_L > \frac{\delta_w}{2M_s h}$$

wherein

Ms: saturation magnetization of second magnetic layer;

h : thickness of second magnetic layer;

$\delta_w$: magnetic wall energy between first and second magnetic layers.

In addition the Curie temperature of the first magnetic layer 2 has a gradient and is lower or higher respectively as the position is closer to the third magnetic layer 15 or the second magnetic layer 3. Said gradient may be continuous or stepwise in the first magnetic layer 2. The difference in Curie temperature between the positions close to the third magnetic layer 15 and the second magnetic layer 3 is generally 10° to 100° C.

Also said gradient is preferably steeper as the position becomes closer to the second magnetic layer in order that the magnetization of the first magnetic layer is efficiently oriented in succession in a stable direction with respect to the magnetization of the second magnetic layer. Thus the gradient of the Curie temperature preferably increases continuously or stepwise as the position becomes closer to the second magnetic layer. The smaller gradient in the vicinity of the third magnetic layer may be generally in a range of 0°–0.05° C./Å, while the larger gradient in the vicinity of the second magnetic layer may be in a range of 0.5°–1° C./Å.

Such gradient in the Curie temperature can be prepared by the method explained in the first embodiment. Furthermore, in addition to three magnetic layers mentioned above, there may be provided a suitable dielectric or reflective layer between the transparent substrate and the magnetic layers, or on a face of the magnetic layers opposite to said substrate, for the purpose of improving the durability or improving the record/erasing sensitivity and the magneto-optical effect.

Furthermore there may be inserted a fourth magnetic or non-magnetic layer between the first and second magnetic layers for the purpose of controlling the exchange coupling therebetween. The fourth magnetic layer may be composed of an iron group element or a rare earth element, or an amorphous magnetic alloy thereof. Also the non-magnetic layer may be composed of a dielectric material such as SiN or AlN, or a non-magnetic metal such as Al, Ti or Cr. Such layer can have a thickness of 10–100 Å.

Now there will be explained the recording method utilizing the magneto-optical recording medium of the third embodiment, with reference to FIG. 11.

Figure 11:
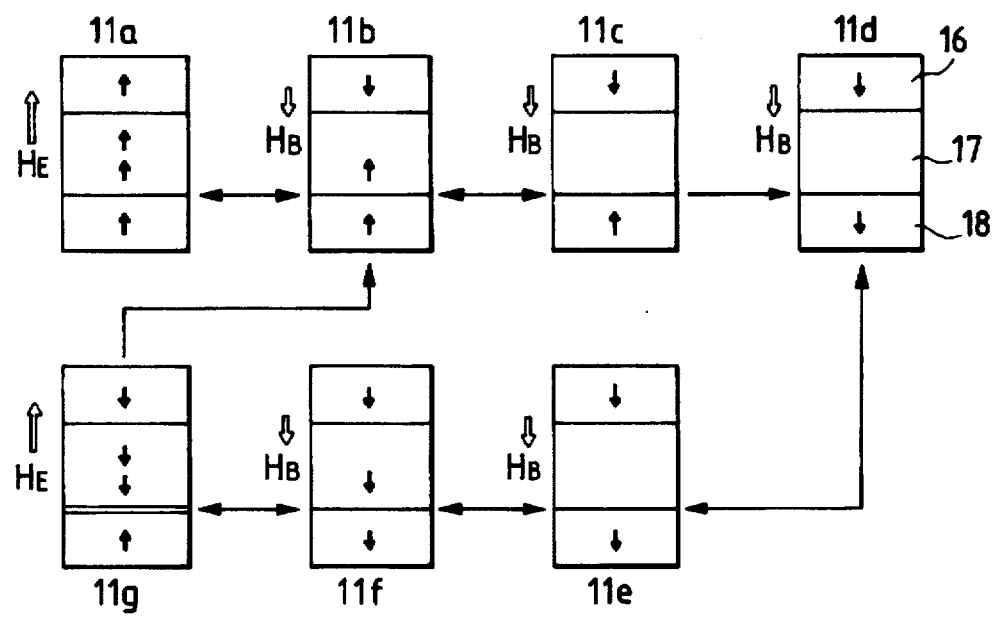
FIG. 11 is a view illustrating the principle of recording method utilizing the magneto-optical recording medium of the third embodiment.

In FIG. 11, the first, second and third magnetic layers are represented respectively by 17, 18 and 16, and different states of magnetization of said magnetic layers are shown by 11a–11g. In the course of recording, there is applied, at a position different from that of the recording head, an upward external magnetic field $H_E$ of a magnitude sufficient for orienting the magnetization of the second magnetic layer of coercive force $H_L$ in a direction but insufficient for inverting the direction of the magnetization of the first magnetic layer of coercive force $H_H$, and there is also applied, at the position of the recording head, a downward bias magnetic field $H_B$ for assisting the recording in the second magnetic layer. Usually the magnitude of the field $H_E$ is larger than that of the field $H_B$, but may be smaller than the latter.

Prior to the explanation of the recording process according to the steps thereof, there will be briefly explained the states 11a to 11g and the transitions between said states.

States 11a and 11g show two binary records at room temperature. The temperature rises progressively in the states 11b, 11c and 11d by heating with the laser beam. States 11b and 11f, or 11c and 11e are different states at an approximately same temperature. A mark ⇆ indicates a reversible magnetizing process with respect to the temperature, while a mark → or ← indicates an irreversible process. In the embodiment shown in FIG. 11, the first, second and third magnetic layers are all composed of thin films of amorphous alloys of rare earth elements and iron group elements with prevailing iron group sub lattice magnetization. In this case, because of the exchange coupling among the layers, the stable state is obtained when the directions of magnetization of two adjacent layers are mutually parallel, and the unstable state is obtained when said directions of magnetization are antiparallel. A boundary magnetic wall exists in said unstable state. The state 11g is the unstable state showing a magnetic wall at the boundary of the first and second magnetic layers. However the coercive force energy of the second magnetic layer has to be so adjusted that the unstable state can be maintained even under zero magnetic field. The third magnetic layer has a small coercive force energy and always assumes a stable state with respect to the first magnetic layer. At the room temperature states (11a, 11g), the second magnetic layer of small coercive force is always oriented upwards by the external magnetic field $H_E$.

In the following there will be explained the recording process, following the steps thereof.

When the temperature is raised from the state 11g, the coercive force of the first magnetic layer decreases rapidly as shown in FIG. 9. Therefore, since the magnetizations of both layers tend to become parallel by the exchange coupling thereof, the magnetization of the first magnetic layer is inverted upwards (state 11b). If the temperature is lowered from this state, the magnetization of the third magnetic layer is also oriented upwards by the exchange coupling effect between the third and first magnetic layers. The medium is cooled in this state to room temperature, and assumes the state 11a. If the medium is heated from state 11a to the state 11b and is again cooled, the medium returns to the state 11a. Therefore, by the application of a laser power corresponding to the temperature of the state 11b, the states 11a and 11g are shifted to the state 11a.

On the other hand, if the temperature is further raised from the state 11b to the state 11c beyond the Curie temperature $T_L$ of the first magnetic layer, the first magnetic layer loses magnetization. A further raise in temperature approximately to the Curie temperature $T_H$ of the second magnetic layer reduces the coercive force thereof, whereby the direction of the magnetization thereof is inverted by the bias magnetic field $H_B$ (state 11d). If the temperature is lowered from this state (states 11d→11e→11f), the first magnetic layer is magnetized downwards by the exchange coupling effect between the first and second magnetic layers (state 11f), and the magnetization of the third magnetic layer is also oriented downwards by the exchange coupling effect between the third and first magnetic layers (state 11f to 11g). After the medium is cooled to room temperature in this state, the direction of the magnetization of the second magnetic layer is inverted by the external magnetic field $H_E$ (state 11g). However, because of the high coercive force, the magnetization of the first magnetic layer is not inverted by the external field $H_E$ but retains the recorded state. Therefore, by the application of a laser power corresponding to the temperature of the state 11d, the states 11a and 11g can both be shifted to the state 11g. Consequently the application of different laser powers can generate different magnetization states, so that the overwriting can be achieved.

In the transition from the state 11g to 11b in the present embodiment, the magnetization of the first magnetic layer has to be inverted by the exchange coupling force against the bias field $H_B$, as in the first and second embodiments.

This transition can however be realized easily and stably, since the Curie temperature of the first magnetic layer is made lower or higher at the position respectively closer to the third or second magnetic layer.

Besides, in the present embodiment, there is provided the third magnetic layer of a high Curie temperature for increasing the Kerr rotation angle and thereby improving the quality of the reproduced signal. Since a portion of the first magnetic layer close to the third magnetic layer has a low Curie temperature, said portion already reaches the Curie temperature at the temperature of said transition from the state 11g to 11b, so that said portion is magnetically disconnected from the third magnetic layer. For this reason, said transition can be achieved easily, without being affected by the orientation of magnetization of the third magnetic layer. Then, with the decrease of temperature, the first magnetic layer exhibits increased coercive energy and is magnetically coupled with the third magnetic layer, whereby the magnetization of said third magnetic layer is oriented in a stable direction with respect to the first magnetic layer, by means of the exchange coupling effect with the first magnetic layer.

The recording sensitivity can be made same as in the conventional medium, since it is not directly affected by the Curie temperature of the third magnetic layer but it depends on the Curie temperature of the first and second magnetic layers.

In the following there will be explained a fourth embodiment of the magneto-optical recording medium of the present invention.

Figure 12:
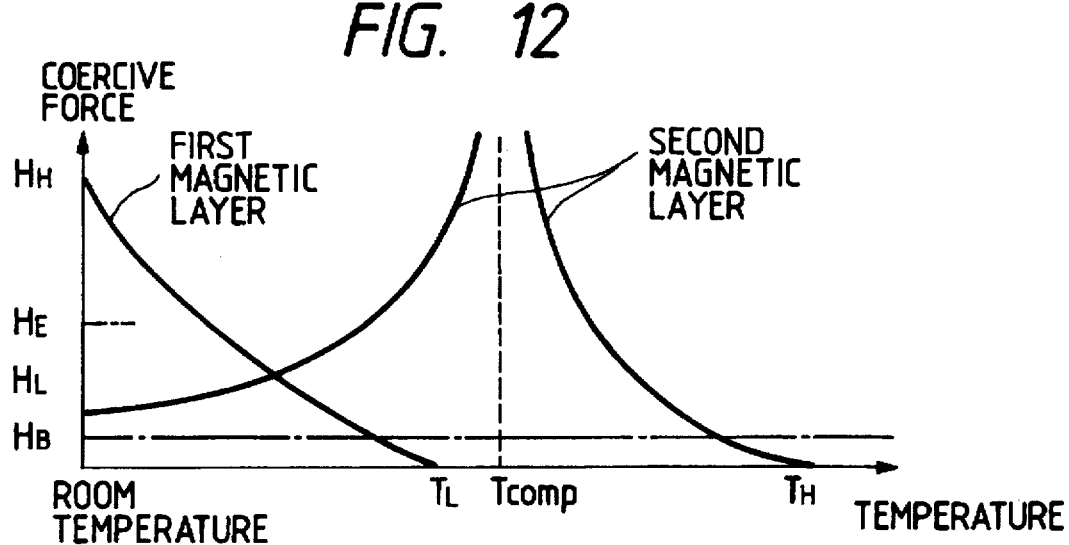
FIG. 12 is a chart showing the relation between the coercive force and the Curie temperature in the respective layer of a fourth embodiment.

In the fourth embodiment, the relation of the coercive force and the Curie temperature in the first magnetic layer and that of the second magnetic layer are as shown in FIG. 12.

It is different from the third embodiment in the process of change of magnetization of the layers in the recording process, but the structure and characteristics are otherwise same as those in the magneto-optical recording medium of the third embodiment.

Figure 13:
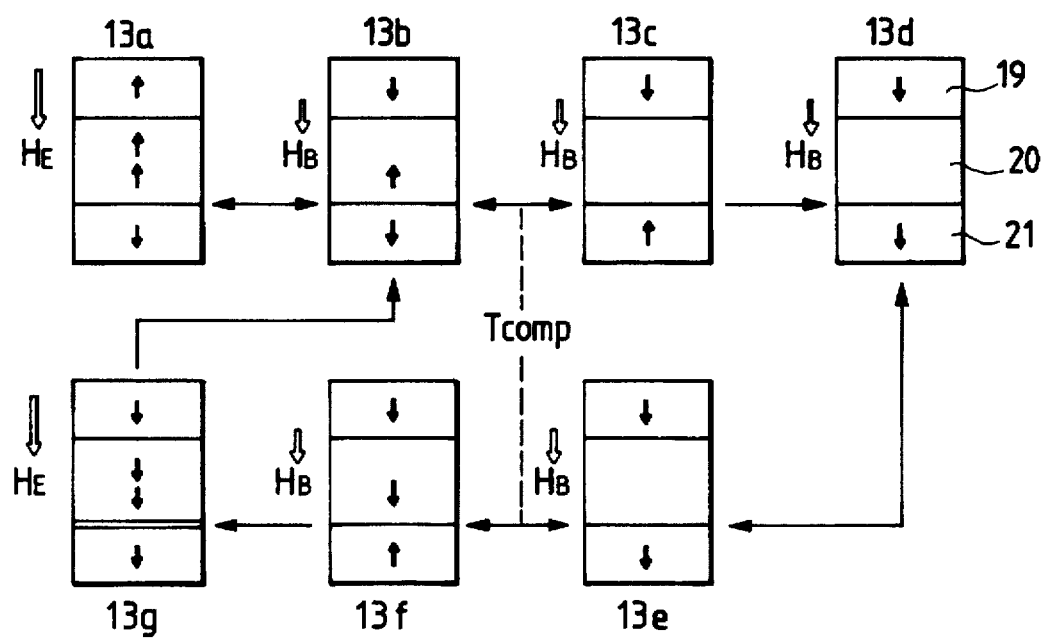
FIG. 13 is a view illustrating the principle of recording method utilizing the magneto-optical recording medium of the fourth embodiment.

Now reference is made to FIG. 13 for explaining the recording method utilizing the magneto-optical recording medium of the fourth embodiment.

In FIG. 13, the first, second and third magnetic layers are represented respectively by 20, 21 and 19, and different states of magnetization of said magnetic layers are shown by 13a–13g. In the course of recording, there is applied, at a position different from that of the recording head, a downward external magnetic field $H_E$ of a magnitude sufficient for orienting the magnetization of the second magnetic layer of coercive force $H_L$ in a direction but insufficient for inverting the direction of the magnetization of the first magnetic layer of coercive force $H_H$, and there is also applied at the position of the recording head or the vicinity thereof, a downward bias magnetic field $H_B$ for assisting the recording in the second magnetic layer. Usually the magnitude of the field $H_E$ is larger than that of the field $H_B$, but may be smaller than the latter. In the present embodiment, the fields $H_E$ and $H_B$ are applied in the same direction, so that the recording bias field $H_B$ may also be used as the external field $H_E$ if the magnitudes are so selected as to satisfy $H_E \leq H_B$.

States 13a and 13g represent two binary records at room temperature. The temperature rises progressively as the states 13b, 13c and 13d by heating with the laser beam. In the embodiment shown in FIG. 13, the second magnetic layer has a compensation temperature $T_{comp}$ between the temperatures corresponding to the states 13b and 13c or 13e and 13f. The third magnetic layer and first magnetic layer are assumed to be composed of thin films of amorphous alloys of rare earth elements and iron group elements with prevailing iron group sub lattice magnetization, while the second magnetic layer is assumed to be composed of a thin film of an amorphous alloy of rare earth elements and iron group elements with prevailing rare earth sub lattice magnetization. In this case, due to the exchange coupling effect between the layers, the state between the third and first magnetic layers is stable or unstable respectively when the directions of magnetization of said layers are parallel or antiparallel, but the state between the first and second magnetic layers is stable or unstable respectively when the directions of magnetization is antiparallel or parallel. In the unstable state, a magnetic wall exists at the boundary of layers. The state 13g is an unstable state with the magnetic wall at the boundary between the first and second magnetic layers. However the coercive force energy of the second magnetic layer has to be so adjusted that the unstable state can be retained even under zero field. The third magnetic layer always assumes a stable state with respect to the first magnetic layer, because of the small coercive force energy. At the room temperature states (13a, 13g), the magnetization of the second magnetic layer of the small coercive force is always oriented downwards by the external field $H_E$ for which the recording bias field $H_B$ may also be used.

In the following there will be explained the recording process, following the steps thereof.

When the temperature is raised from the state 13g, the coercive force of the first magnetic layer decreases rapidly as shown in FIG. 12, and the coercive force of the second magnetic layer increases. Since the directions of magnetization of the first and second magnetic layers tend to become antiparallel due to the exchange coupling therebetween, the magnetization of the first magnetic layer is inverted upwards (state 13b). If the temperature is lowered from this state, the magnetization of the third magnetic layer is also oriented upwards by the exchange coupling effect between the third and first magnetic layers. The medium is cooled to room temperature in this state, thus assuming the state 13a. If the medium is heated from the state 13a to the state 13b and is again cooled, the medium returns to the state 13a. Therefore, by the application of a laser power corresponding to the temperature of the state 13b, the states 13a and 13g are shifted to the state 13a.

On the other hand, if the temperature is further raised from the state 13b to the state 13c beyond the compensation temperature $T_{comp}$ of the second magnetic layer, the magnetization thereof is reversibly inverted. Upon further heating, the coercive force of the second magnetic layer is reduced, whereby the magnetization thereof is inverted by the bias magnetic field $H_B$ (state 13d). When the temperature is lowered from this state, the medium is cooled without change in the magnetization state (state 13e), and, upon passing through the compensation temperature $T_{comp}$, the magnetization of the second magnetic layer is reversibly inverted. About that time, the first magnetic layer generates downward magnetization due to the exchange coupling effect between the first and second magnetic layers (state 13f), and the magnetization of the third magnetic layer is also oriented downwards by the exchange coupling effect between the third and first magnetic layers (state 13f to 13g). The medium is then cooled to room temperature, whereby the second magnetic layer again exhibits a small coercive force and the magnetization thereof is inverted by the external field $H_E$ for which the recording bias magnetic field $H_B$ may also be used (state 13g). However, since the first magnetic layer has a large coercive force, the magnetization thereof is not inverted by the external field $H_E$ but retains the recorded state. In this manner, by the application of a laser power corresponding to the temperature of the state 13d, the states 13a and 13g can be shifted to the state 13g.

Consequently the application of different laser power can generate different magnetization states, so that the overwriting can be achieved.

In the transition from the state 13g to 13b, the magnetization of the second magnetic layer has to be inverted by the exchange force against the bias field $H_B$, as in the case of FIG. 11.

Said transition can however be realized easily, in the present embodiment, by the gradient of the Curie temperature of the first magnetic layer, which is lower or higher respectively at the position closer to the third or second magnetic layer, despite the presence of the third magnetic layer of a high Curie temperature. There can be achieved the recording also when the exchange coupling between the third and first magnetic layers functions in such a manner that said layers are in the stable state when the directions of magnetization thereof are antiparallel and said layers are in the unstable state when the directions of magnetization thereof are parallel.

In order that the magnetization of the first magnetic layer is oriented in the stable direction with respect to that of the second magnetic layer at the temperature of the states 11b, 13b or 11f, 13f shown in FIGS. 11 and 13, the portion exhibiting magnetization in the first magnetic layer should preferably be as thin as possible. Also in the course of cooling from said temperature to room temperature, the thickness of the portion newly generating magnetization for each decrease of a predetermined temperature should preferably be as small as possible, in order that said magnetization is oriented in succession in the stable direction. However the total thickness of the first magnetic layer has a lower limit since the coercive energy cannot be endlessly reduced as explained before, and the Curie temperature of the first magnetic layer is also limited in consideration of the recording sensitivity. For these reasons, the thickness of the portion newly generating magnetization for each decrease of the temperature is also restricted.

In order to augment the effect of the present invention under such limitations, it is desirable to increase the thickness of the portion newly generating magnetization in the first magnetic layer for each decrease of a given temperature, according to the decrease of temperature.

Stated differently, it is desirable that the gradient of Curie temperature in the first magnetic layer becomes steeper as the position comes closer to the second magnetic layer.

Also at the temperature of the states 11b, 13b or 11f, 13f in FIGS. 11 and 13, if the thickness of the portion exhibiting magnetization in the first magnetic layer is thin enough for orienting the magnetization of said portion in a stable direction with respect to the magnetization of the second magnetic layer, the Curie temperature of said portion need not be relatively lower than that of the second magnetic layer. The Curie temperature of said portion is rather preferably higher in order to obtain a high magnetic wall energy between the first and second magnetic layers at the high temperature range.

In the foregoing explanation, it is assumed, at the temperature corresponding to the state 11b, 13b, 11f or 13f shown in FIG. 11 or 13, that the portion with lower Curie temperature in the first magnetic layer has reached the Curie temperature and has completely lost the magnetization. However, even if the magnetization is not completely lost, the effect of the present invention can be likewise obtained if the contribution of said portion to the Zeeman energy based on the external magnetic field and to the coercive energy is lower, since the effective thickness of the first magnetic layer can be considered equal to that of the portion with higher Curie temperature.

For the purpose of confirming the effect of the present invention, two magneto-optical recording media based on the present invention and three media for comparative reference were prepared, and subjected to the comparison of temperature characteristics of magnetizing process and of dynamic characteristics as will be explained in the following.

EXAMPLE 6

A disk-shaped polycarbonate substrate having pregrooves and preformatted signals was set and rotated in a sputtering chamber equipped with multiple targets, at a distance of 20 cm from the targets.

At first a $Si_3N_4$ protective layer of a thickness of 600 Å was formed in argon atmosphere with a $Si_3N_4$ target, with a sputtering rate of ca. 40 Å/min. and a sputtering pressure of 0.15 Pa.

Then a third magnetic layer of Gd-($Fe_{0.7}Co_{0.3}$) with prevailing Fe—Co sub lattice magnetization, with a thickness of 300 Å, Ms=50 emu/cm$^3$ and Curie temperature equal to 300° C. or higher was formed with three targets of Gd, Fe and Co in argon atmosphere, with a sputtering rate ca. 100 Å/min. and a sputtering pressure of 0.15 Pa.

Then a first magnetic layer of Tb-($Fe_{1-y}Co_y$) with prevailing Fe—Co sub lattice magnetization, with a thickness of 280 Å, $H_H$=ca. 15 kOe and Ms=50 emu/cm$^3$ was formed with three targets of Tb, Fe and Co in argon atmosphere, with a sputtering rate of ca. 100 Å/min. and a sputtering pressure of 0.15 Pa. The composition of Tb—Fe—Co was regulated by varying the electrical powers respectively supplied to the targets. The cobalt amount y was varied as 0, 0.02, 0.04 and 0.06 for each thickness of 70 Å to obtain Curie temperatures of 120°, 130°, 145° and 155° C. respectively. In this manner obtained was a structure featuring the present invention, in which the Curie temperature is lower or higher respectively at the position closer to the third or second magnetic layer.

Then an intermediate layer of Gd—Fe—Co with prevailing Gd sub lattice magnetization, with a thickness of 100 Å and Ms=300 emu/cm$^3$ was formed with three targets of Gd, Fe and Co in argon atmosphere, with a sputtering rate of 100 Å/min. and a sputtering pressure of 0.15 Pa. Said intermediate layer serves to regulate the exchange coupling force between the first and second magnetic layers.

Then a second magnetic layer of $(Gd_{0.50}Dy_{0.50})$–$(Fe_{0.60}Co_{0.40})$ with prevailing Gd—Dy sub lattice magnetization, with a thickness of 700 Å, $T_H$=ca. 250° C., $T_{comp}$=ca. 170° C., $H_L$=ca. 2 kOe and Ms=100 emu/cm$^3$, was formed with three targets of $Gd_{0.50}Dy_{0.50}$, Fe and Co in argon atmosphere, with a sputtering rate of ca. 100 Å/min. and a sputtering pressure of 0.15 Pa.

Finally a $Si_3N_4$ protective layer of a thickness of 600 Å was formed with a $Si_3N_4$ target, with a sputtering rate of ca. 40 Å/min. and a sputtering pressure of 0.15 Pa.

Then the magneto-optical recording medium was completed by adhering, with hot-melt adhesive, a polycarbonate substrate onto the substrate subjected to the above-explained film formations.

EXAMPLE 7

A third magnetic layer of Tb-$(Fe_{0.70}Co_{0.30})$ with prevailing Fe—Co sub lattice magnetization, with a thickness of 200 Å, Ms=300 emu/cm$^3$ and Curie temperature equal to 250° C. or higher, was formed with three targets of Tb, Fe and Co in argon atmosphere, with a sputtering rate of ca. 100 Å/min. and a sputtering pressure of 0.15 Pa.

Then a first magnetic layer of $(Gd_yTb_{1-y})$-Fe with prevailing Fe sub lattice magnetization, with a thickness of 300 Å, $H_H$=ca. 10 kOe and Ms=ca. 50 emu/cm$^3$, was formed with three targets of Gd, Tb and Fe in argon atmosphere, with a sputtering rate of ca. 100 Å/min. and a sputtering pressure of 0.15 Pa. The composition of Gd—Tb—Fe was regulated by varying the electric powers supplied respectively to the targets. The Gd amount y was varied from 0 to 0.50 with a steeper increase as the film grows, whereby the Curie temperature varied from 120° to 170° C. In this manner obtained was the structure featuring the present invention, wherein the first magnetic layer had a gradient in the Curie temperature, rising more steeply as the position comes closer to the second magnetic layer.

A magneto-optical recording medium was prepared in otherwise same manner as in the Example 6.

COMPARATIVE REFERENCE EXAMPLE 9

A magneto-optical recording medium was prepared in the same manner as in the Example 6, except that the first magnetic layer was directly formed on the $Si_3N_4$ protective layer, without formation of the third magnetic layer.

COMPARATIVE REFERENCE EXAMPLE 10

A magneto-optical recording medium was prepared in the same manner as in the Example 6, except that the first magnetic layer was composed of a uniform layer of Tb—Fe—Co with y=0.04, in which the Curie temperature was 145° C.

COMPARATIVE REFERENCE EXAMPLE 11

A magneto-optical recording medium was prepared in the same manner as in the Example 6, except that the third magnetic layer was not formed and that the first magnetic layer was composed of a uniform layer of Tb—Fe—Co with y=0.15, having a Curie temperature of 210° C.

Figure 14:
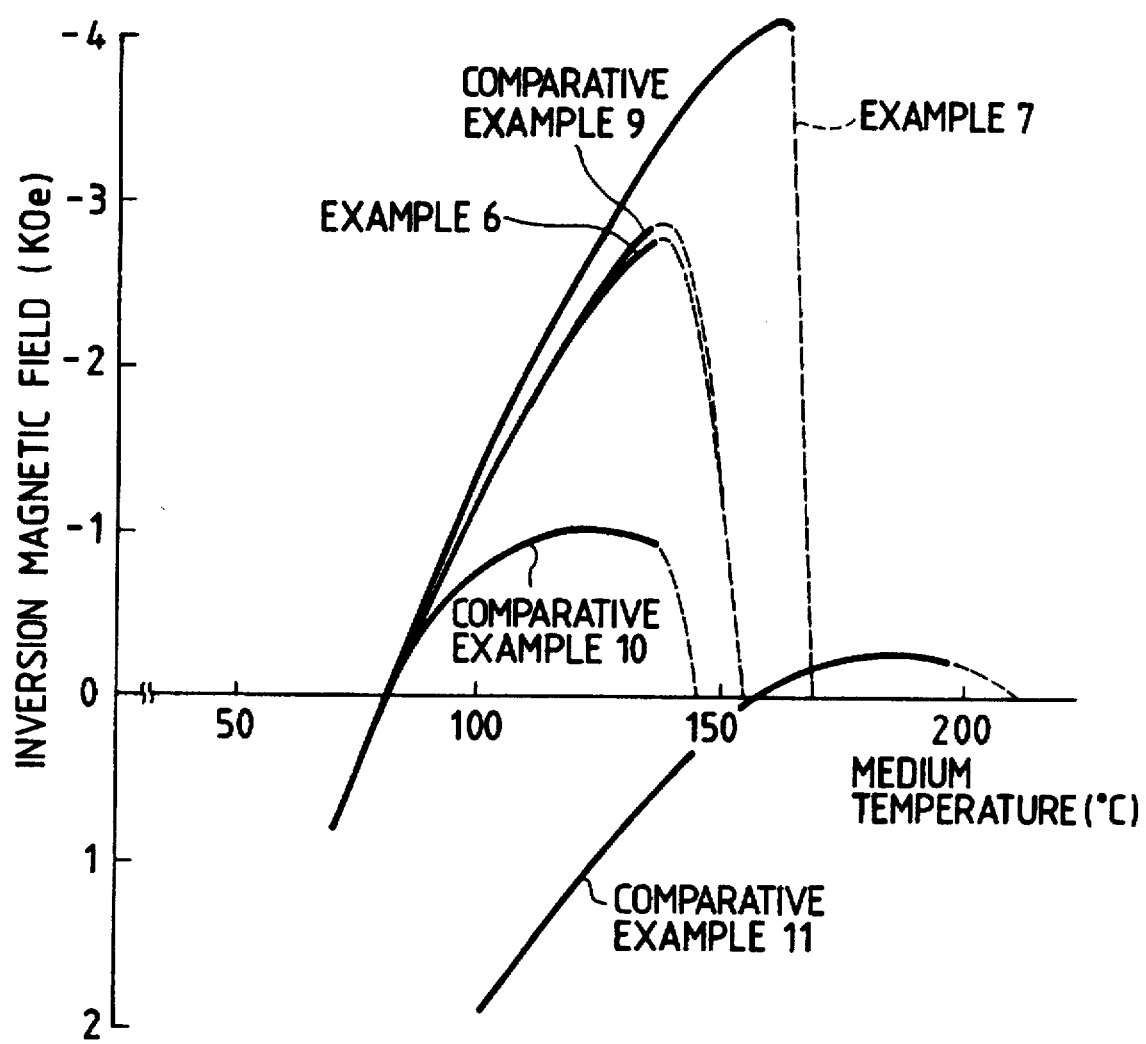
FIG. 14 is a chart showing the relation between the magnetic field to invert the magnetization for the second magnetic layer and the temperature in the fourth embodiment.

The above-mentioned five media were subjected to the measurement of temperature characteristics of magnetization process, and FIG. 14 shows the temperature dependence of the inversion magnetic field for inverting the magnetization of the third magnetic layer. In FIG. 14, a positive or negative inversion magnetic field respectively indicates that the magnetization of the third magnetic layer is inverted following or against the direction of the applied magnetic field. Consequently the margin of the recording bias magnetic field in the overwriting process corresponds to the negative peak value of the inverting field in FIG. 14.

As will be apparent from FIG. 14, the media of the Examples 6 and 7 of the present invention had a large margin for the recording bias magnetic field, as in the Comparative Reference Example 9, despite of the presence of the third magnetic layer of a high Curie temperature. On the other hand, the media of the Reference Examples 10 and 11 showed a small margin of the recording bias magnetic field, lacking the gradient of the Curie temperature in the first magnetic layer.

Also these magneto-optical recording media were set on a record/reproducing apparatus and subjected to recording in the presence of a bias magnetic field of 400 Oe and an external field of 3 Koe, with a linear speed of ca. 8.5 m/sec. and with a laser beam of 830 nm condensed to a spot of ca. 1.5 μm and modulated with binary powers of 5 and 12 mW, a frequency of 1 MHz and a duty ratio of 50%.

After said recording, the same track was again subjected to recording with same powers and with a frequency of 1.5 MHz, and the obtained results are summarized in Tab. 4.

The media of the Examples 6 and 7 of the present invention showed high C/N ratios due to the higher carrier level in comparison with that in the Comparative Reference Example 9. The medium of the Comparative Reference Example 10 showed a low C/N ratio due to the high recording noise level. Also the medium of the Comparative Reference Example 11 showed a low C/N ratio due to the high recording noise level, as the recording with the low power was insufficient, though the improvement in the carrier level was tried by the increase in the Curie temperature in the first magnetic layer.

TABLE 4

|  | Carrier level (dBm) | Noise level (dBm) | C/N (dB) |
|---|---|---|---|
| Example 6 | −1 | −57 | 56 |
| Example 7 | −3 | −58 | 55 |
| Comp. Ref. Ex. 9 | −8 | −57 | 49 |
| Comp. Ref. Ex. 10 | −4 | −49 | 45 |
| Comp. Ref. Ex. 11 | −6 | −48 | 42 |

Also a magneto-optical recording medium constituting an example of the present invention, and two media for comparative reference were prepared in the following manner and subjected to the measurements of dynamic characteristics.

EXAMPLE 8

A third magnetic layer of Gd-(Fe$_{0.70}$Co$_{0.30}$) with prevailing Gd sub lattice magnetization, with a thickness of 300 Å, Ms=50 emu/cm$^3$ and Curie temperature equal to 300° C. or higher was formed with three targets of Gd, Fe and Co in argon atmosphere, with a sputtering rate of ca. 100 Å/min. and a sputtering pressure of 0.15 Pa.

Then a first magnetic layer of Tb-((Fe$_{0.75}$Co$_{0.25}$)$_{1-y}$Cr$_y$) with prevailing Fe—Co sub lattice magnetization, with a thickness of 300 Å, H$_H$=ca. 15 kOe and Ms=50 emu/cm was formed with three targets of Tb, Fe$_{0.75}$Co$_{0.25}$ and Cr in argon atmosphere with a sputtering rate of ca. 100 Å/min. and a sputtering pressure of 0.15 Pa. The composition of Tb—Fe—Co—Cr was regulated by varying the electric powers respectively supplied to the Tb, Fe$_{0.75}$Co$_{0.25}$ and Cr targets. The Cr amount y was progressively reduced from 0.20 to 0 with a steeper rate of decrease as the film grows. Thus the Curie temperature varied from 120° to ca. 250° C., and there was thus obtained a structure featuring the present invention, wherein the first magnetic layer had a gradient in the Curie temperature, which increases more steeply as the position comes closer to the second magnetic layer.

Then a second magnetic layer of Dy—Fe—Co with prevailing Dy sublattice magnetization, with a thickness of 1500 Å, T$_H$=ca. 250° C., T$_{comp}$=ca. 170° C., H$_L$=ca. 5 kOe and Ms=150 emu/cm$^3$ was formed with three targets of Dy, Fe and Co in argon atmosphere, with a sputter rate of ca. 100 Å/min. and a sputtering pressure of 0.15 Pa.

The intermediate layer, for regulating the exchange coupling between the first and second magnetic layers was not formed.

A magneto-optical recording medium was formed in otherwise same manner as in the Example 6.

COMPARATIVE REFERENCE EXAMPLE 12

A magneto-optical recording medium was prepared in the same manner as in the Example 8, except that the first magnetic layer was composed of a uniform layer of Tb—Fe—Co with y=0.10, having a Curie temperature of 180° C.

COMPARATIVE REFERENCE EXAMPLE 13

A magneto-optical recording medium was prepared in the same manner as in the Comparative Reference Example 12, except that the third magnetic layer was not formed.

These magneto-optical recording media were set on a record/reproducing apparatus, and were subjected to the measurement of the dynamic characteristics by a recording operation under same conditions as explained before, except that the external magnetic field was changed to 6 kOe. The medium of the Example 8 stably provided a satisfactory C/N ratio of 55 dB. The medium of the Comp. Ref. Ex. 12 showed a loss in the C/N ratio to 48 dB due to the high recording noise. Also the medium of the Comp. Ref. Ex. 13 could provide a C/N ratio close to 50 dB by the recording with binary laser powers modified to 9 and 12 mW, but the characteristics were unstable because the recording temperatures of high and low levels were too close.

EXAMPLE 9

A magneto-optical recording medium was prepared in the same manner as in the Example 8, except that the second magnetic layer of Dy—Fe—Co with prevailing Fe—Co sub lattice magnetization, with a thickness of 1500 Å, T$_H$=ca. 250° C., H$_L$=ca. 5 kOe and Ms=150 emu/cm$^3$ was prepared with three targets of Dy, Fe and Co with a sputtering rate of ca. 100 Å/min. and a sputtering pressure of 0.15 Pa.

The obtained medium was capable of overwriting with a bias magnetic field of 200–600 Oe, and provided a C/N ratio of 55 dB.

COMPARATIVE REFERENCE EXAMPLE 14

A magneto-optical recording medium was prepared in the same manner as in the Example 9 except that the first magnetic layer was composed of a uniform layer of Tb—Fe—Co with y=0.04, showing a Curie temperature of 145° C. The obtained medium was capable of overwriting with a bias magnetic field of 200 Oe, providing a C/N ratio of 49 dB, but was incapable of overwriting at a bias magnetic field of 600 Oe.

As detailedly explained in the foregoing, the magneto-optical recording medium of the present invention having a gradient in Curie temperature in the first magnetic layer behaves as if the thickness of said first magnetic layer is decreased when heated by the laser beam at recording, whereby the inversion of magnetization by the exchange coupling force is facilitated against the bias magnetic field, and the margin of recording operation is therefore widened.

Consequently there is obtained a wider freedom in the designing of the medium, and there can be more easily obtained a medium satisfying various requirements such as on the C/N ratio, sensitivity, and external field required for initialization. Also it is rendered possible to improve the quality of reproduced signals without sacrificing the recording sensitivity.

The present invention is not limited to the foregoing embodiments but is subjected to various modifications or applications, and the present invention includes all such modifications or applications within the scope and spirit of the appended claims.

What is claimed is:

1. A magneto-optical recording medium comprising:
   first and second magnetic layers successively formed on a substrate, said layers comprising amorphous rare earth transition metal alloys, wherein said second magnetic layer is exchange-coupled with said first magnetic layer and wherein said first magnetic layer has a higher coercive force H$_H$ than the coercive force H$_L$ of said second magnetic layer, such that the following condition is satisfied:

$H_H > H_L > \delta_w / 2 M_s h$, where M$_s$ is the saturation magnetization of the second magnetic layer, h is the film thickness of the second magnetic layer, and $\delta_w$ is the magnetic wall energy between the two magnetic layers, and
   wherein said first magnetic layer has a gradient of Curie temperature in its thickness direction such that the Curie temperature of said first layer decreases with distance from said second magnetic layer from a highest Curie temperature to a lowest Curie temperature, wherein the maximum value of the Curie temperature gradient in said first layer is less than or equal to 250° C., and the Curie temperature of said second magnetic layer is higher than the lowest Curie temperature of said first magnetic layer.

2. A medium according to claim 1, which further comprises a third magnetic layer between said first and second magnetic layers.

3. A medium according to claim 1, wherein said gradient varies in a continuous and/or stepwise manner.

4. A magneto-optical recording medium comprising:

a substrate and a magnetically coupled laminate structure comprising third, first and second magnetic layers successively formed on said substrate, wherein said first magnetic layer has a higher coercive force $H_H$ than the coercive force $H_L$ of said second magnetic layer such that the following condition is satisfied:

$$H_H > H_L > \delta_w / 2 M_S h,$$

where $M_S$ is the saturation magnetization of the second magnetic layer, h is the film thickness of the second magnetic layer, and $\delta_w$ is the magnetic wall energy between said first and second magnetic layers;

said first magnetic layer has a gradient of Curie temperature in its thickness direction from a lowest Curie temperature to a highest Curie temperature such that the Curie temperature is lower near said third magnetic layer and higher near said second magnetic layer, wherein the maximum value of the Curie temperature gradient in said first magnetic layer is less than or equal to 250° C.;

the Curie temperature of said second magnetic layer is higher than the lowest Curie temperature of said first magnetic layer; and the Curie temperature of said third magnetic layer is higher than the lowest Curie temperature of said first magnetic layer.

5. A medium according to claim 4, wherein a fourth magnetic layer is inserted between said first and second magnetic layers.

6. A medium according to claim 4, wherein said gradient varies continuously or stepwise.

7. A medium according to claim 4, wherein said third, first and second magnetic layer comprise alloys of rare earth and transition metal elements.

8. A method of recording information comprising the steps of:

selecting an overwritable magneto-optical recording medium comprising a substrate having exchange-coupled first and second magnetic layers successively laminated thereon, said first magnetic layer having a gradient from a lowest Curie temperature to a highest Curie temperature such that the Curie temperature is higher near said second magnetic layer and is lower away from said second magnetic layer, wherein the maximum value of the Curie temperature gradient in said first magnetic layer is less than or equal to 250° C., wherein the Curie temperature of said second magnetic layer is higher than the lowest Curie temperature of said first magnetic layer, and wherein said first magnetic layer has a higher coercive force $H_H$ than the coercive force $H_L$ of said second magnetic layer such that the following condition is satisfied:

$$H_H > H_L > \delta_w / 2 M_S h,$$

where $M_S$ is the saturation magnetization of the second magnetic layer, h is the film thickness of the second magnetic layer, and $\delta_w$ is the magnetic wall energy between the two magnetic layers;

orienting a direction of magnetization of said second magnetic layer; and in accordance with an information signal, while applying a bias magnetic field, selectively (i) irradiating the medium with a light beam of a power which is sufficient to heat the medium to a first temperature which is close to the Curie temperature of said first magnetic layer and at which the direction of magnetization of the first magnetic layer is oriented in a direction that is stable with respect to the direction of magnetization of the second magnetic layer without changing the direction of magnetization of said second magnetic layer, or (ii) irradiating the medium with a light beam of a power which is sufficient to heat the medium to a second temperature which is close to the Curie temperature of the second magnetic layer and at which the direction of magnetization of the second magnetic layer is inverted, and orienting the direction of magnetization of the first magnetic layer in a direction that is stable with respect to the direction of magnetization of said second magnetic layer in a cooling period.

9. A medium according to claim 4, wherein a fourth non-magnetic layer is inserted between said first and second magnetic layers.

10. A medium according to claim 1, further comprising a third non-magnetic layer between said first and second magnetic layers.

11. A method of recording information comprising the steps of:

selecting an overwritable magneto-optical recording medium comprising a substrate having exchange-coupled first and second magnetic layers successively laminated thereon, said first magnetic layer having a gradient of Curie temperature in its thickness direction such that the Curie temperature is higher near said second magnetic layer and lower away from said second magnetic layer, wherein the maximum value of the curie temperature gradient in said first magnetic layer is less than or equal to 250° C., wherein the Curie temperature of said second magnetic layer is higher than the lowest Curie temperature of said first magnetic layer, and wherein said first magnetic layer has a higher coercive force $H_H$ than the coercive force $H_L$ of said second magnetic layer such that the following condition is satisfied:

$$H_H > H_L > \delta_w / 2 M_S h,$$

where $M_S$ is the saturation magnetization of the second magnetic layer, h is the film thickness of the second magnetic layer, and $\delta_w$ is the magnetic wall energy between the two magnetic layers;

applying a first magnetic field which is sufficient for orienting a direction of magnetization of said second magnetic layer but is insufficient for inverting a direction of magnetization of said first magnetic layer; and in accordance with an information signal, while applying a bias magnetic field, selectively (i) irradiating the medium with a light beam of a power which is sufficient to heat the medium close to the Curie temperature of said first magnetic layer, thereby orienting the direction of magnetization of the first magnetic layer in a direction that is stable with respect to the direction of magnetization of the second magnetic layer without changing the direction of magnetization of said second magnetic layer, or (ii) irradiating the medium with a light beam of a power which is sufficient to heat the medium close to the Curie temperature of the second magnetic layer, thereby inverting the direction of magnetization of the second magnetic layer and simultaneously orienting the direction of magnetization of the first magnetic layer in a direction that is stable with respect to the direction of magnetization of said second magnetic layer.

* * * * *

UNITED STATES PATENT AND TRADEMARK OFFICE
CERTIFICATE OF CORRECTION

PATENT NO. : 5,679,474
DATED : October 21, 1997
INVENTOR(S) : TSUTOMI SHIRATORI

It is certified that error appears in the above-identified patent and that said Letters Patent is hereby corrected as shown below:

ON THE COVER PAGE

[56] REFERENCES CITED

FOREIGN PATENT DOCUMENTS

"6/1986" should read --6/1987--.

[57] ABSTRACT

Line 3, "a" should be deleted.
Line 4, "liminated" should read --laminated--.

COLUMN 1

Line 9, "1989" should read --1989,--.
Line 30, "over-coming" should read --overcoming--.
Line 30, "such" should read --such a--.
Line 30, "have" should read --has--.

COLUMN 4

Line 53, "the closer is to be" should read --as it becomes closer to the--.

COLUMN 5

Line 57, "different" should read --are different--.

UNITED STATES PATENT AND TRADEMARK OFFICE
CERTIFICATE OF CORRECTION

PATENT NO. : 5,679,474
DATED : October 21, 1997
INVENTOR(S) : TSUTOMI SHIRATORI

It is certified that error appears in the above-identified patent and that said Letters Patent is hereby corrected as shown below:

COLUMN 6

Line 45, "5d" should read --5d)--.

COLUMN 7

Line 1, "form" should read --from--.

COLUMN 8

Line 10, "gorup" should read --group--.

COLUMN 9

Line 18, "the" (second occurrence) should be deleted.

COLUMN 10

Line 47, "A," should read --Å,--.

COLUMN 11

Line 28, "same" should read --the same--.
Line 31, "example" should read --examples--.

UNITED STATES PATENT AND TRADEMARK OFFICE
CERTIFICATE OF CORRECTION

PATENT NO. : 5,679,474  Page 3 of 4
DATED : October 21, 1997
INVENTOR(S) : TSUTOMI SHIRATORI It is certified that error appears in the above-identified patent and that said Letters Patent is hereby corrected as shown below:

COLUMN 18

Line 8, "same" should read --the same--.
Line 50, "is" should read --are--.

COLUMN 19

Line 41, "13g" (second occurrence) should read --13b--.

COLUMN 21

Line 9, "obtained was a structure" should read --a structure was obtained--.
Line 52, "obtained was the structure" should read --a structure was obtained--.
Line 57, "same" should read --the same--.

COLUMN 22

Line 25, "of the" should read --the--.
Line 39, "same" should read --the same--.

COLUMN 23

Line 34, "same" should read --the same--.
Line 51, "same" should read --the same--.

UNITED STATES PATENT AND TRADEMARK OFFICE
CERTIFICATE OF CORRECTION

PATENT NO. : 5,679,474

DATED : October 21, 1997

INVENTOR(S) : TSUTOMI SHIRATORI

It is certified that error appears in the above-identified patent and that said Letters Patent is hereby corrected as shown below:

COLUMN 25

Line 37, "layer" should read --layers--.

COLUMN 26

Line 31, "curie" should read --Curie--.

Signed and Sealed this

Twentieth Day of October, 1998

Attest:

BRUCE LEHMAN

Attesting Officer

Commissioner of Patents and Trademarks